(12) United States Patent
Zhao et al.

(10) Patent No.: US 11,546,102 B2
(45) Date of Patent: Jan. 3, 2023

(54) DATA SENDING METHOD, INFORMATION SENDING METHOD, AND APPARATUS

(71) Applicant: HUAWEI TECHNOLOGIES CO., LTD., Guangdong (CN)

(72) Inventors: Yue Zhao, Beijing (CN); Zheng Yu, Beijing (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/062,150

(22) Filed: Oct. 2, 2020

(65) Prior Publication Data

US 2021/0021390 A1 Jan. 21, 2021

Related U.S. Application Data

(63) Continuation of application No. PCT/CN2018/082059, filed on Apr. 4, 2018.

(51) Int. Cl.
*H04L 5/00* (2006.01)
*H04W 4/80* (2018.01)
(Continued)

(52) U.S. Cl.
CPC ............ *H04L 5/0044* (2013.01); *H04W 4/80* (2018.02); *H04W 72/14* (2013.01); *H04W 74/0833* (2013.01); *H04W 80/02* (2013.01)

(58) Field of Classification Search
CPC ... H04L 5/0044; H04L 1/0003; H04L 1/0009; H04W 4/80; H04W 72/14; H04W 74/0833; H04W 80/02; H04W 28/18; H04W 72/12
See application file for complete search history.

(56) References Cited

U.S. PATENT DOCUMENTS

2016/0100422 A1 4/2016 Papasakellariou et al.
2019/0104553 A1* 4/2019 Johansson ......... H04W 74/0833
(Continued)

FOREIGN PATENT DOCUMENTS

CN 102196570 A 9/2011
CN 102265695 A 11/2011
CN 105101378 A 11/2015

OTHER PUBLICATIONS

Ericsson, "[99bis#53][MTC/NB-IoT] EDT indication via PRACH," 3GPP TSG-RAN WG2 #100, R2-1713057, Reno, Nevada, USA, Nov. 27-Dec. 1, 2017, 30 pages.
(Continued)

*Primary Examiner* — Steven H Nguyen
(74) *Attorney, Agent, or Firm* — Fish & Richardson P.C.

(57) ABSTRACT

Methods, apparatus, and systems for data or information transmission are provided. In one aspect, a data sending method by a terminal device includes: determining indication information, determining, based on the indication information, a transport block size (TBS) used to send data, and sending the data based on the determined TBS. The terminal device can determine at least two of first information indicating that the TBS is a first TBS, second information indicating that the TBS is a second TBS, or third information indicating the terminal device to select a TBS from a TBS set as a third TBS used by the terminal device to send data. The TBS set is determined based on the first TBS, and can include at least one of the second TBS or the third TBS. The indication information includes one of the at least two of the first, second, or third information.

20 Claims, 5 Drawing Sheets

(51) Int. Cl.
    *H04W 72/14*    (2009.01)
    *H04W 74/08*    (2009.01)
    *H04W 80/02*    (2009.01)

(56) References Cited

U.S. PATENT DOCUMENTS

| | | | | |
|---|---|---|---|---|
| 2019/0159197 | A1* | 5/2019 | Shrestha | H04W 72/0413 |
| 2019/0159257 | A1* | 5/2019 | Rico Alvarino | H04L 1/0003 |
| 2019/0215872 | A1* | 7/2019 | Park | H04W 74/0833 |
| 2019/0306873 | A1* | 10/2019 | Lin | H04W 74/0833 |
| 2020/0059390 | A1* | 2/2020 | Zhang | H04L 1/0072 |
| 2020/0344818 | A1* | 10/2020 | Höglund | H04W 74/004 |
| 2021/0136826 | A1* | 5/2021 | Chang | H04W 72/02 |

OTHER PUBLICATIONS

Extended European Search Report issued in European Application No. 18913985.0 dated Jan. 13, 2021, 12 pages.
Lenovo, "Common control messages for R13-MTC," 3GPP TSG RAN WG1 Meeting #80bis, R1-151768, Belgrade, Serbia, Apr. 20-24, 2015, 5 pages.
MediaTek Inc, "Early Data Transmission TBS Determination," 3GPP TSG RAN WG1 Meeting #92bis, R1-1804143, Sanya, China, Apr. 16-20, 2018, 4 pages.
WI rapporteur (Ericsson), "Agreement summary for Rel-15 Even further enhanced MTC for L Te 6.2.5," 3GPP TSG-RAN WG1 Meeting #92, R1-1803176, Athens, Greece, Feb. 26-Mar. 2, 2018, 26 pages.
3GPP TS 36.213 V14.3.0 (Jun. 2017), "3rd Generation Partnership Project; Technical Specification Group Radio Access Network; Evolved Universal Terrestrial Radio Access (E-UTRA); Physical layer procedures(Release 14)," Jun. 2017, 460 pages.
PCT International Search Report and Written Opinion issued in International Application No. PCT/CN2018/082059 dated Sep. 7, 2018, 17 pages (with English translation).
Office Action issued in Chinese Application No. 201880091865.X dated Aug. 3, 2021, 8 pages.
Samsung, "Early data transmission for eMTC," 3GPP TSG RAN WG1 Meeting #92, R1-1801924, Athens, Greece, Feb. 26-Mar. 2, 2018, 6 pages.
Ericsson, "Remaining general aspects of early data transmission," 3GPP TSG-RAN WG2 #100, Tdoc R2-1713054, Reno, Nevada, USA, Nov. 27-Dec. 1, 2017, 7 pages.
Office Action issued in Chinese Application No. 201880091865.X dated Jan. 27, 2022, 7 pages.
Intel Corporation, "Draft CR on introduction of new TBS fo DL 256QAM in Rel-14," 3GPP TSG-WG1 Meeting #88bis, R1-1704668, Spokane, USA, Apr. 3-7, 2017, 17 pages.
Office Action issued in Chinese Application No. 201880091865.X dated Jun. 6, 2022, 4 pages.
3GPP TS 36.213 V15.1.0 (Mar. 2018), "3rd Generation Partnership Project; Technical Specification Group Radio Access Network; Evolved Universal Terrestrial Radio Access (E-UTRA); Physical layer procedures(Release 15)," Mar. 2018, 501 pages.
3GPP TS 36.331 V15.1.0 (Mar. 2018), "3rd Generation Partnership Project; Technical Specification Group Radio Access Network; Evolved Universal Terrestrial Radio Access (E-UTRA); Radio Resource Control (RRC); Protocol specification Release 15)," Mar. 2018, 786 pages.

* cited by examiner

DATA SENDING METHOD, INFORMATION SENDING METHOD, AND APPARATUS

CROSS-REFERENCE TO RELATED APPLICATIONS

This application is a continuation of international Application No. PCT/CN2018/082059, filed on Apr. 4, 2018, the disclosure of which is hereby incorporated by reference in its entirely.

TECHNICAL FIELD

Embodiments of this application relate to the communications field, and in particular, to a data sending method, an information sending method, and an apparatus.

BACKGROUND

Currently, wireless communications systems are applied and deployed on a large scale, and can provide various types of communication, for example, voices, data, and multimedia services, for a plurality of users.

In a discussion process of a current long term evolution (LTE) technology, for a third message, that is, Msg3, in a random access process, uplink user data may be transmitted in Msg3, and a media access control protocol (MAC) random access response (RAR) is used.

In the prior art, a MAC protocol data unit (PDU) includes a MAC header, zero MAC RAR or a plurality of MAC RARs, and an optional padding part. In the prior art, a network may indicate a largest transport block size (TBS) to a terminal device through Msg3, so that the terminal device can use only the largest TBS to transmit uplink user data. However, not all terminal devices need to use the largest TBS. If a size of the uplink user data sent by the terminal device is less than the largest TBS configured by the network, the terminal device needs to add a padding bit when transmitting the uplink user data, to expand a size of a transport block used to send the uplink user data to the largest TBS. When the terminal device sends the data in this manner, a waste of transmission resources is caused, and a situation on a network side is not considered.

SUMMARY

Embodiments of this application provide a data sending method, an information sending method, and an apparatus, so that a situation on a network side can be considered as much as possible, and a waste of transmission resources can be avoided, According to a first aspect, an embodiment of this application provides a data sending method, including:
  determining, by a terminal device, indication information, where the indication information can be used for at least two of the following items: indicating that a transport block size TBS used by the terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a TBS in the TBS set, the TES set is a set determined based on the first TBS, and the indication information is used for one of the at least two items;
  determining, by the terminal device based on the indication information, the TBS used to send data; and
  sending, by the terminal device, the data based on the determined TBS.

in a possible design, the determining, by a terminal device, indication information includes:
  determining, by the terminal device, the indication information based on cell-specific common signaling, where the cell-specific common signaling includes the indication information; and/or
  determining, by the terminal device, the indication information based on a coverage enhancement level of the terminal device, where corresponding indication information is set for each coverage enhancement level supported by a network device; and/or
  determining, by the terminal device, the indication information based on a coverage enhancement mode of the terminal device, where corresponding indication information is set for each coverage enhancement mode supported by the network device; and/or
  determining, by the terminal device, the indication information based on a first subheader in a media access control MAC protocol data unit PDU sent by the network device, where the first subheader includes the indication information; and/or
  determining, by the terminal device, the indication information by receiving a MAC random access response RAR, where the MAC RAR includes the indication information.

In a possible design, the determining, by the terminal device based on the indication information, the TBS used to send data includes:
  determining, by the terminal device based on a temporary cell radio network temporary identifier and the indication information, that the TBS used to send data is the first MS, the second TBS, or the third TBS; or
  determining, by the terminal device based on a random access radio network temporary identifier and the indication information, that the TBS used to send data is the first TBS, the second TBS, or the third TBS; or
  determining, by the terminal device based on a preamble identifier and the indication information, that the TBS used to send data is the first TBS, the second TBS, or the third TBS.

In a possible design,
  the method further includes: receiving, by the terminal device, first common signaling sent by the network device, and when the first common signaling does not include the indication information, determining, by the terminal device, that the TBS used to send data is the first TBS; or
  the method further includes: receiving, by the terminal device, second common signaling sent by the network device, and when the second common signaling includes the indication information, the determining, by the terminal device based on the indication information, the MS used to send data includes: determining, by the terminal device, the third TBS based on the indication information and the TBS set; or
  the method further includes: receiving first dedicated signaling sent by the network device, and when the first dedicated signaling does not include the indication information, determining, by the terminal device, that the TBS used to send data is the first TBS; or
  the method further includes: receiving second dedicated signaling sent by the network device, and when the second dedicated signaling includes the indication information, the determining, by the terminal device based on the indication information, the TBS used to send data includes: determining, by the terminal device, the third TBS based on the indication information and the TBS set; or the method further includes: receiving a first MAC PDU sent by the network device, and when the first MAC PDU does not include the first subheader, determining, by the terminal device, that the TBS used to send data is the first TBS; or the method further includes: receiving a second MAC PDU sent by the network device, and when the second MAC PDU includes the first subheader, the determining, by the terminal device based on the indication information, the TBS used to send data includes: determining, by the terminal device, the third TBS based on the indication information in the first subheader and the TBS set.

In a possible design, the terminal device determines the indication information based on the first subheader in the media access control MAC protocol data unit PDU sent by the network device, where the first subheader includes the indication information;

the MAC PDU includes the MAC RAR; and the first subheader includes one or more pieces of indication information, and each piece of indication information corresponds to one or more terminal devices; and/or the first subheader is a last subheader in a MAC header of the MAC PDU.

In a possible design, the terminal device is at a coverage enhancement level 0, a coverage enhancement level 1, or a coverage enhancement mode A; and when the terminal device determines the indication information by receiving the MAC RAR, the MAC RAR includes a RAR grant, and the MAC RAR does not include a reserved bit; and/or the RAR grant does not include one or more of a channel stale information request field, an uplink delay field, a modulation and coding scheme field, or a repetition quantity field; and/or a quantity of zero padding bits in the RAR grant is less than (4−M), where M is equal to a quantity of bits in the RAR grant that indicate a narrowband index of a message 3; and/or a quantity of bits of the modulation and coding scheme field in the RAR grant is less than 3; and/or a quantity of bits of the repetition quantity field in the RAR grant is less than 2; and/or a quantity of bits of a transmit power control field in the RAR grant is less than 3; and/or a quantity of bits of a control channel narrowband index field in the message 3 or a message 4 in the RAR grant is less than 2.

In a possible design, the terminal device is at a coverage enhancement level 2, a coverage enhancement level 3, or a coverage enhancement mode B;

when the terminal device determines the indication information by receiving the MAC RAR, the MAC RAR includes a RAR grant; and the MAC RAR does not include a reserved bit; and/or the RAR grant does not include one or more of a transport block size field, an uplink delay field, or a repetition quantity field; and/or a quantity of bits of the transport block size field in the MAC RAR grant is less than 2; and/or a quantity of bits of the repetition quantity field in the MAC RAR grant is less than 3; and/or a quantity of bits of a control channel narrowband index field in the message 3 or a message 4 in the MAC RAR grant is less than 2.

According to a second aspect, an embodiment of this application further provides an information sending method, including:

determining, by a network device, indication information, where the indication information can be used for al least two of the following items: indicating that a TBS used by a terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a TBS in the TBS set, the TBS set is a set determined based on the first TBS, and the indication information is used for one of the at least two items;

sending, by the network device, the indication information; and receiving, by the network device based on the TBS, the data sent by the terminal device.

In a possible design, sending, by the network device, the indication information through cell-specific common signaling, where the cell-specific common signaling includes the indication information; and/or sending, by the network device, the indication information based on a coverage enhancement level, where the network device sends corresponding indication information for each coverage enhancement level supported by the network device; and/or sending, by the network device, the indication information based on a coverage enhancement mode, where the network device sends corresponding indication information for each coverage enhancement mode supported by the network device; and/or sending, by the network device, the indication information through a first subheader in a media access control MAC protocol data unit PDU, where the first subheader includes the indication information; and/or sending, by the network device, the indication information through a MAC random access response RAR, where the MAC RAR includes the indication information.

In a possible design, the receiving, by the network device based on the TBS, the data sent by the terminal device includes:

determining, by the network device based on a temporary cell radio network temporary identifier of the terminal device and the indication information, that the TBS used by the terminal device to send data is the first TBS, the second TBS, or the third TBS, and receiving the data based on the determined TBS; or determining, by the network device based on the indication information and a random access radio network temporary identifier that corresponds to the terminal device, that the TBS used by the terminal device to send data is the first TBS, the second TBS, or the third TBS, and receiving the data based on the determined TBS; or determining, by the network device based on the indication information and a preamble identifier that corresponds to the terminal device, that the TBS used by the terminal device to send data is the first TBS, the second TBS, or the third TBS, and receiving the data based on the determined TBS.

In a possible design, the method further includes: sending, by the network device, first common signaling, and when the first common signaling does not include the indication information, the receiving, by the network device based on the TBS, the data sent by the terminal device includes: determining, by the network device, that the TBS used by the terminal device to send data is the first TBS, and receiving the data based on the determined TBS; or the method further includes: sending, by the network device, second common signaling, and when the second common signaling includes the indication information, the receiving, by the network device based on the TBS, the data sent by the terminal device includes: determining, by the network device, the third TBS based on the indication information and the TBS set, and receiving the data based on the determined TBS; or the method further includes: sending, by the network device, first dedicated signaling, and when the first dedicated signaling does not include the indication information, the receiving, by the network device based on the TBS, the data sent by the terminal device includes: determining, by the network device, that the TBS used by the terminal device to send data is the first TBS, and receiving the data based on the determined TBS; or the method further includes: sending, by the network device, second dedicated signaling, and when the second dedicated signaling includes the indication information, the receiving, by the network device based on the TBS, the data sent by the terminal device includes: determining, by the network device, the third TBS based on the indication information and the TBS set, and receiving the data based on the determined TBS; or the method further includes: sending, by the network device, a first MAC PDU, and when the first MAC PDU does not include the first subheader, the receiving, by the network device based on the TBS, the data sent by the terminal device includes: determining, by the network device, that the TBS used by the terminal device to send data is the first TBS, and receiving the data based on the determined TBS; or the method further includes: sending, by the network device, a second MAC PDU, and when the second MAC PDU includes the first subheader, the receiving, by the network device based on the TBS, the data sent by the terminal device includes: determining, by the network device, the third TBS based on the indication information in the first subheader and the TBS set, and receiving the data based on the determined TBS.

In a possible design, the network device sends the indication information through the first subheader in the media access control MAC protocol data unit PDU, where the first subheader includes the indication information;

the MAC PDU includes the MAC RAR; and the first subheader includes one or more pieces of indication information, and each piece of indication information corresponds to one or more terminal devices, where N is a positive integer; and/or the first subheader is a last subheader in a MAC header.

In a possible design, the terminal device is at a coverage enhancement level 0, a coverage enhancement level 1, or a coverage enhancement mode A;

when the network device sends the indication information through the MAC random access response RAR, the MAC RAR includes a RAR grant; and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the random access response grant that indicate a narrowband index of a second message 3; and/or a quantity of bits of the modulation and coding scheme field in the RAR grant is less than 3; and/or a quantity of bits of the repetition quantity field in the RAR grant is less than 2; and/or a quantity of bits of a transmit power control field in the RAR grant is less than 3; and/or a quantity of bits of a control channel narrowband index field in the message 3 or a message 4 in the RAR grant is less than 2.

In a possible design, the terminal device is at a coverage enhancement level 2, a coverage enhancement level 3, or a coverage enhancement mode B;

when the network device sends the indication information through the MAC random access response RAR, the MAC RAR includes a RAR grant; and the RAR does not include a reserved bit; and/or the RAR does not include one or more of a transport block size field, an uplink delay field, or a repetition quantity field; and/or a quantity of bits of the transport block size field in the RAR grant is less than 2; and/or a quantity of bits of the repetition quantity field in the RAR grant is less than 3; and/or a quantity of bits of a control channel narrowband index field in the message 3 or a message 4 in the RAR grant is less than 2.

According to a third aspect, an embodiment of this application further provides a terminal device, including:

a processing module, configured to determine indication information, where the indication information can be used for at least two of the following items: indicating that a transport block size TBS used by the terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a MS in the TBS set, the TBS set is a set determined based on the first TBS, and the indication information is used for one of the at least two items, where the processing module is further configured to determine, based on the indication information, the TBS used to send data; and a sending module, configured to send the data based on the determined TBS.

in a possible design, the processing module is specifically configured to determine the indication information based on cell-specific common signaling, where the cell-specific common signaling includes the indication information; and/or the processing module is specifically configured to determine the indication information based on a coverage enhancement level of the terminal device, where corresponding indication information is set for each coverage enhancement level supported by a network device; and/or the processing module is specifically configured to determine the indication information based on a coverage enhancement mode of the terminal device, where corresponding indication information is set for each coverage enhancement mode supported by the network device; and/or the processing module is specifically configured to determine the indication information based on a first subheader in a media access control MAC protocol data unit PDU sent by the network device, where the first subheader includes the indication information; and/or the processing module is specifically configured to determine the indication information by receiving a MAC random access response RAR, where the MAC RAR includes the indication information.

In a possible design, the processing module is specifically configured to determine, based on a temporary cell radio network temporary identifier and the indication information, that the TBS used to send data is the first TBS, the second TBS, or the third TBS; or the processing module is specifically configured to determine, based on a random access radio network temporary identifier and the indication information, that the TBS used to send data is the first TBS, the second TBS, or the third TBS; or the processing module is specifically configured to determine, based on a preamble identifier and the indication information, that the MS used to send data is the first TBS, the second TBS, or the third TBS.

In a possible design, the terminal device further includes a receiving module, where the receiving module is configured to receive first common signaling sent by the network device, and when the first common signaling does not include the indication information, the processing module is further configured to determine, by the terminal device, that the TBS used to send data is the first TBS; or the receiving module is configured to receive second common signaling sent by the network device, and when the second common signaling includes the indication information, the processing module is specifically configured to determine the third TBS based on the indication information and the IBS set; or the receiving module is configured to receive first dedicated signaling sent by the network device, and when the first dedicated signaling does not include the indication information, the processing module is further configured to determine that the TBS used to send data is the first IBS; or the receiving module is configured to receive second dedicated signaling sent by the network device, and when the second dedicated signaling includes the indication information, the processing module is specifically configured to determine the third TBS based on the indication information and the TBS set; or the receiving module is configured to receive a first MAC PDU sent by the network device, and when the first MAC PDU does not include the first subheader, the processing module is further configured to determine that the IBS used to send data is the first TBS; or the receiving module is configured to receive a second MAC PDU sent by the network device, and when the second MAC PDU includes the first subheader, the processing module is specifically configured to determine the third IBS based on the indication information and the TBS set.

In a possible design, the processing module determines the indication information based on the first subheader in the media access control MAC protocol data unit PDU sent by the network device, where the first subheader includes the indication information;

the MAC PDU includes the MAC RAR; and the first subheader includes one or more pieces of indication information, and each piece of indication information corresponds to one or more terminal devices, where N is a positive integer; and/or the first subheader is a last subheader in a MAC header of the MAC PDU.

In a possible design, the terminal device is at a coverage enhancement level 0, a coverage enhancement level 1, or a coverage enhancement mode A; and when the terminal device determines the indication information by receiving the MAC RAR, the MAC RAR includes a RAR grant, and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the RAR grant that indicate a narrowband index of a message 3; and/or a quantity of bits of the modulation and coding scheme field in the RAR grant is less than 3; and/or a quantity of bits of the repetition quantity field in the RAR grant is less than 2; and/or a quantity of bits of a transmit power control field in the RAR grant is less than 3; and/or a quantity of bits of a control channel narrowband index field in the message 3 or a message 4 in the RAR grant is less than 2.

In a possible design, the terminal device is at a coverage enhancement level 2, a coverage enhancement level 3, or a coverage enhancement mode B;

when the terminal device determines the indication information by receiving the MAC random access response RAR, the MAC RAR includes a RAR grant; and the MAC RAR does not include a reserved bit; and/or the RAR grant does not include one or more of a transport block size field, an uplink delay field, or a repetition quantity field; and/or a quantity of bits of the transport block size field in the MAC RAR grant is less than 2; and/or a quantity of bits of the repetition quantity field in the MAC RAR grant is less than 3; and/or a quantity of bits of a control channel narrowband index field in the message 3 or a message 4 in the MAC RAR grant is less than 2.

According to a fourth aspect, an embodiment of this application further provides a network device, including:

a processing module, configured to determine indication information, where the indication information can be used for at least two of the following items: indicating that a TBS used by a terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a TBS in the TBS set, the TBS set is a set determined based on the first TBS, and the indication information is used for one of the at least two items; and a sending module, configured to send the indication information, where the processing module is further configured to receive, based on the TBS through a receiving module, the data sent by the terminal device.

In a possible design, the sending module is configured to send the indication information through cell-specific common signaling, where the cell-specific common signaling includes the indication information; and/or the sending module is configured to send the indication information based on a coverage enhancement level, where the network device sends corresponding indication information for each coverage enhancement level supported by the network device; and/or the sending module is configured to send the indication information based on a coverage enhancement mode, where the network device sends corresponding indication information for each coverage enhancement mode supported by the network device; and/or the sending module is configured to send the indication information through a first subheader in a media access control MAC protocol data unit PDU, where the first subheader includes the indication information; and/or the sending module is configured to send the indication information through a MAC random access response RAR, where the MAC RAR includes the indication information.

In a possible design, the processing module is configured to determine, based on a temporary cell radio network temporary identifier of the terminal device and the indication information, that the TBS used by the terminal device to send data is the first TBS, the second TBS, or the third TBS; or the processing module is configured to determine, based on the indication information and a random access radio network temporary identifier that corresponds to the terminal device, that the TBS used by the terminal device to send data is the first TBS, the second TBS, or the third TBS; or the processing module is configured to determine, based on the indication information and a preamble identifier that corresponds to the terminal device, that the TBS used by the terminal device to send data is the first TBS, the second TBS, or the third TBS.

In a possible design, the sending module is configured to send first common signaling, and when the first common signaling does not include the indication information, the processing module is configured to determine that the TBS used by the terminal device to send data is the first TBS; or the sending module is configured to send second common signaling, and when the second common signaling includes the indication information, the processing module is configured to determine the third TBS based on the indication information and the TBS set; or the sending module is configured to send first dedicated signaling, and when the first dedicated signaling does not include the indication information, the processing module is configured to determine that the TBS used by the terminal device to send data is the first TBS; or the sending module is configured to send second dedicated signaling, and when the second dedicated signaling includes the indication information, the processing module is configured to determine the third TBS based on the indication information and the TBS set; or the sending module is configured to send a first MAC PDU, and when the first MAC PDU does not include the first subheader, the processing module is configured to determine that the TBS used by the terminal device to send data is the first TBS; or the sending module is configured to send a second MAC PDU, and when the second MAC PDU includes the first subheader, the processing module is configured to determine the third TBS based on the indication information in the first subheader and the TBS set.

In a possible design, the sending module sends the indication information through the first subheader in the media access control MAC protocol data unit PDU, where the first subheader includes the indication information;

the MAC PDU includes the MAC RAR; and the first subheader includes one or more pieces of indication information, and each piece of indication information corresponds to one or more terminal devices, where N is a positive integer; and/or the first subheader is a last subheader in a MAC header.

In a possible design, the terminal device is at a coverage enhancement level 0, a coverage enhancement level 1, or a coverage enhancement mode A;

when the network device sends the indication information through the MAC random access response RAR, the MAC RAR includes a RAR grant; and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the random access response grant that indicate a narrowband index of a second message 3; and/or a quantity of bits of the modulation and coding scheme field in the RAR grant is less than 3; and/or a quantity of bits of the repetition quantity field in the RAR grant is less than and/or a quantity of bits of a transmit power control field in the RAR grant is less than 3; and/or a quantity of bits of a control channel narrowband index field in the message 3 or a message 4 in the RAR grant is less than 2.

In a possible design, the terminal device is at a coverage enhancement level 2, a coverage enhancement level 3, or a coverage enhancement mode B;

when the network device sends the indication information by receiving the MAC RAR, the MAC RAR includes a RAR grant; and the RAR does not include a reserved bit; and/or the RAR does not include one or more of a transport block size field, an uplink delay field, or a repetition quantity field; and/or a quantity of bits of the transport block size field in the RAR grant is less than 2; and/or a quantity of bits of the repetition quantity field in the RAR grant is less than 3; and/or a quantity of bits of a control channel narrowband index field in the message 3 or a message 4 in the RAR grant is less than 2.

In the fourth aspect of this application, composition modules of the network device may further perform the steps described in the second aspect and the various possible implementations. For details, refer to the descriptions in the second aspect and the various possible implementations.

According to a fifth aspect, an embodiment of this application provides a computer-readable storage medium. The computer-readable storage medium stores an instruction. When the instruction is run on a computer, the computer is enabled to perform the methods in the foregoing aspects.

According to a sixth aspect, an embodiment of this application provides a computer program product that includes an instruction. When the computer program product runs on a computer, the computer is enabled to perform the methods in the foregoing aspects.

According to a seventh aspect, an embodiment of this application provides a communications apparatus. The communications apparatus may include an entity such as a terminal device, a network device, or a chip. The communications apparatus includes a processor and a memory. The memory is configured to store an instruction. The processor is configured to execute the instruction in the memory, so that the communications apparatus performs the method according to either the first aspect or the second aspect.

According to an eighth aspect, this application provides a chip system. The chip system includes a processor that is configured to support a network device or a terminal device in implementing functions in the foregoing aspects, for example, send or process data and/or information in the foregoing methods. In a possible design, the chip system further includes a memory. The memory is configured to store a program instruction and data that are necessary for the network device. The chip system may include a chip, or may include a chip and another discrete component.

DESCRIPTION OF EMBODIMENTS

Figure 1:
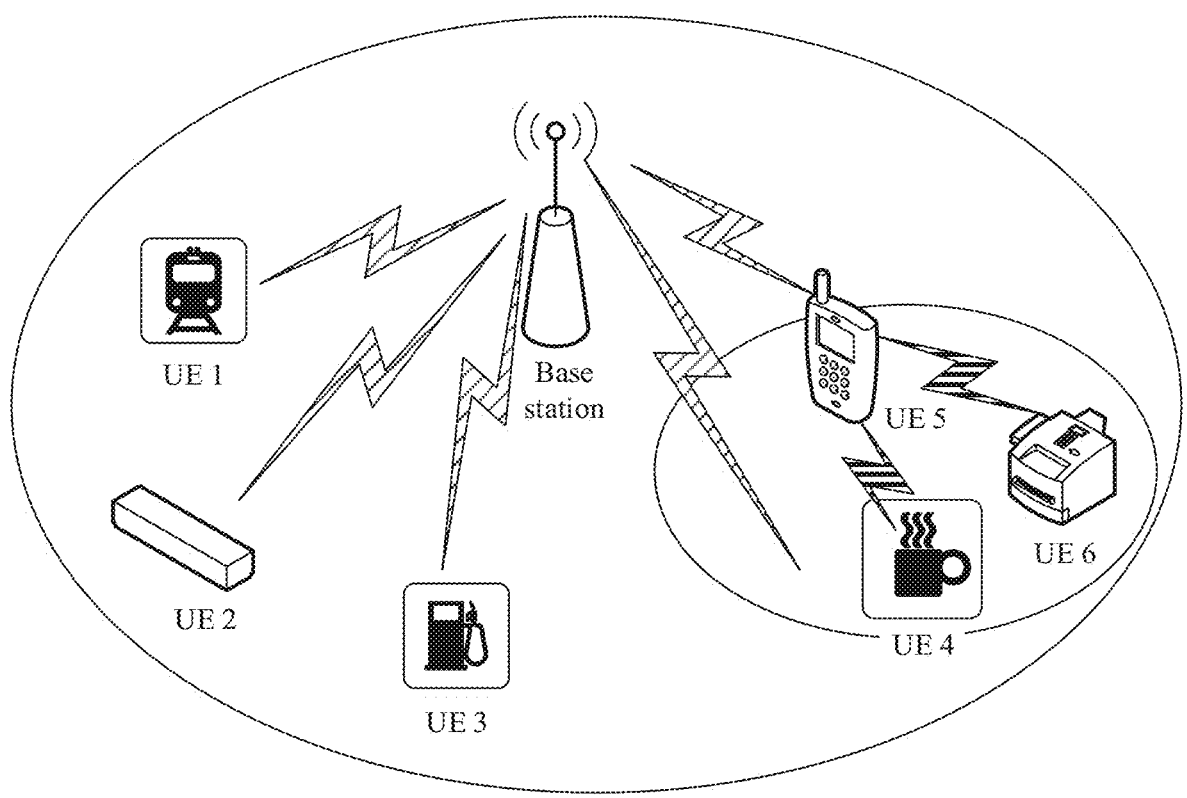
FIG. 1 is a schematic diagram of a system architecture of a data sending method according to an embodiment of this application.

Embodiments of this application provide a data sending method, an information sending method, and an apparatus, so that a situation on a network side can be considered as much as possible and a waste of transmission resources can be avoided.

The following describes the embodiments of this application with reference to accompanying drawings.

In the specification, claims, and accompanying drawings of this application, the terms "first," "second," and so on are intended to distinguish between similar objects but do not necessarily indicate a specific order or sequence. It should be understood that the terms used in such a way are interchangeable in appropriate circumstances, which is merely a discrimination manner that is used when objects having a same attribute are described in the embodiments of this application. In addition, the terms "include," "contain," and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions in the embodiments of the present application may be applied to various communications systems for data processing, for example, code division multiple access (CDMA), time division multiple access (TDMA), frequency division multiple access (FDMA), orthogonal frequency division multiple access (OFDMA), single carrier frequency division multiple access (single carrier FDMA, SC-FDMA), and other systems. The terms "system" and "network" can be interchanged with each other. The CDMA system may implement radio technologies such as universal terrestrial radio access (UTRA) and CDMA 2000. UTRA may include a wideband CDMA (WCDMA) technology and another variation technology of CDMA. CDMA2000 may cover the interim standard (IS) 2000 (IS-2000), the IS-95 standard, and the IS-856 standard. A radio technology such as a global system for mobile communications (GSM) may be implemented in the TDMA system. A radio technology such as evolved universal terrestrial radio access (evolved UTRA, E-UTRA), ultra mobile broadband (UMB), IEEE 802.11 (Wi-Fi), IEEE 802.16 (WiMAX), IEEE 802.20, or Flash OFDMA may be implemented in the OFDMA system. UTRA and E-UTRA are UMTS and an evolved version of UMTS. A new release of UMTS, namely, E-UTRA, is used in 3GPP long term evolution (LTE) and various releases evolved based on LTE. A fifth generation (5 Generation, "5G" for short) communications system and a new radio ("NR" for short) are next-generation communications systems that are under research. In addition, the communications systems 100 may be further applicable to a future-oriented communications technology, and are all applicable to the technical solutions provided in the embodiments of the present invention. System architectures and service scenarios described in the embodiments of the present invention are intended to describe the technical solutions in the embodiments of the present invention more clearly, and do not constitute any limitation on the technical solutions provided in the embodiments of the present application. A person of ordinary skill in the art may know that with evolution of a network architecture and emergence of a new service scenario, the technical solutions provided in the embodiments of the present application are also applicable to similar technical problems.

FIG. 1 is a schematic structural diagram of a possible radio access network (RAN for short) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one or more network devices. The network device may be any type of device with a wireless transceiver function, or a chip disposed in a device with a wireless transceiver function. The network device includes but is not limited to a base station (for example, a base station BS, a NodeB, an evolved NodeB, eNodeB, eNB, a gNodeB, gNB in a fifth generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. The plurality of base stations may support networks using the foregoing one or more technologies, or a future evolved network. The core network may support networks using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description. The plurality of network devices may be base stations of a same type or base stations of different types. The base station may communicate with the terminal devices 1 to 6, or may communicate with the terminal devices 1 to 6 through a relay station. The terminals 1-6 may support communication with a plurality of base stations using different technologies. For example, the terminal device may support communication with a base station supporting an LTE network, may support communication with a base station supporting the 5G network, or may support a dual connection to a base station supporting an LTE network and a base station supporting the 5G network. For example, the terminal is connected to a radio access network (RAN) node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1-6 are also referred to as user equipments (UE), mobile stations (MS), mobile terminals (MT), terminals, or the like, and are devices that provide voice and/or data connectivity for a user, or chips disposed in the devices, for example, handheld devices or vehicle-mounted devices having wireless connection functions. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, and the like.

In this embodiment of this application, the base station and UE 1 to UE 6 form a communications system. In the communications system, the base station sends one or more of system information, a RAR message, or a paging message to one or more of the UE 1 to the UE 6. In addition, the UE 4 to the UE 6 also form a communications system. In the communications system, the UE 5 may be implemented as a function of a base station, and the UE 5 may send one or more of system information, control information, or a paging message to one or more of the UE 4 and the UE 6.

For data transmission performed by the UE by using a TBS, another possible solution in the related technology is that the network device notifies a largest TBS, and the UE may select, based on the largest TBS, a TBS less than the largest TBS for data transmission. When receiving data sent by the UE, a base station side needs to perform blind detection on the TBS. However, in this solution, a UE side mainly selects a TBS based on a size of currently to-be-sent data, and the UE side cannot select the TBS based on load on a network side or the like. In other words, how the UE selects a TBS suitable for current data transmission of the UE based on the load on the network side and the like can balance complexity on the network side and improve flexibility on the UE side and is a problem that needs to be resolved.

Figure 2:
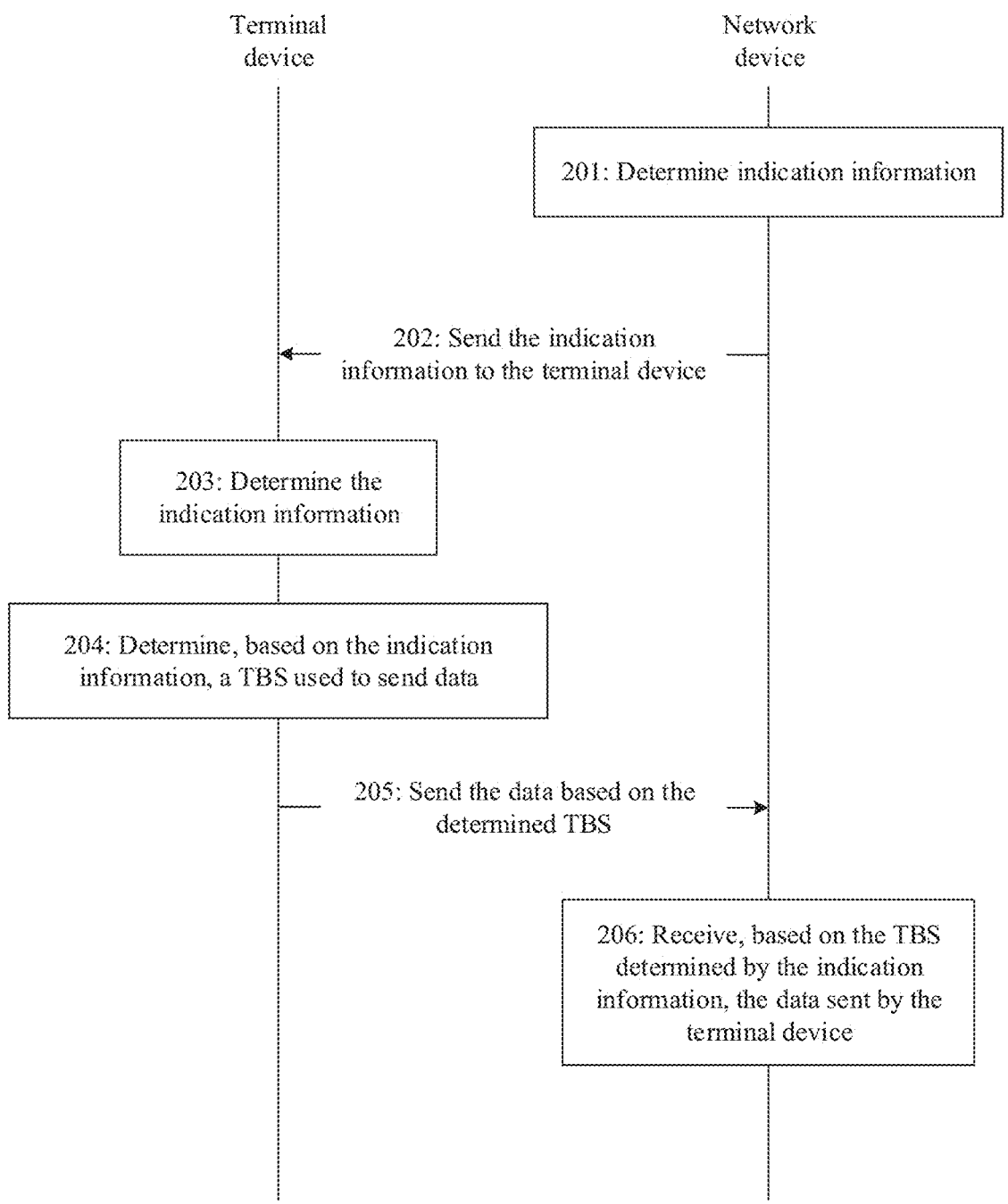
FIG. 2 is a schematic flowchart of interaction between a terminal device and a network device according to an embodiment of this application.

FIG. 2 is a schematic flowchart of interaction between a network device and a terminal device according to an embodiment of this application. A data transmission method provided in this embodiment of this application mainly includes the following steps.

201: The network device determines indication information, where the indication information can be used for at least two of the following items: indicating that a TBS used by the terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a TBS in the TBS set, the TBS set is a set determined based on the first TBS, and the indication information is used for one of the at least two items.

In this embodiment of this application, the network device may configure one or more TBSs for the data to be sent by the terminal device, or the network device may indicate the terminal device how to determine the TBS. For example, the network device configures the terminal device to determine the TBS set based on the first TBS. For example, the first TBS may be a lamest TBS configured by the network device, the TBS set may include a plurality of TBSs less than the first TBS, and the TBS set includes the second TBS and/or the third TBS. The network device may configure the first TBS for the terminal device, or the network device may configure the second TBS for the terminal device, or the network device may indicate the terminal device to determine the third TBS from the TBS set. For example, the network device directly indicates UE to use a value in the set, for example, indicate, by using an existing MCS/TBS field, to use a value in the set. The value may be the first TBS or the second TBS configured by a network. For another example, the network device may indicate the terminal device to select a TBS from the TBS set. If the terminal device selects the third TBS, the network device may determine, through blind detection, that the TBS selected by the terminal device from the TBS set is the third TBS. To indicate, to the terminal device, how the terminal device determines the TBS, the network device may determine the indication information. The indication information can be used for at least two of the following items: indicating that the TBS used by the terminal device to send data is the first TBS, indicating that the TBS used by the terminal device to send data is the second TBS, and indicating the terminal device to select a TBS from the TBS set as the third TBS used by the terminal device to send data.

It should be noted that the indication information is used for one of the at least two items. For example, the network device indicates that the TBS used to send data is the first TBS, indicates that the TBS used to send data is the second TBS, or indicates the terminal device to select a TBS from the TBS set as the TBS used to send data. A manner used by the network device to determine the item indicated by the indication information may be determined based on current load of the network device.

202: The network device sends the indication information to the terminal device.

In this embodiment of this application, after the network device determines the indication information, the network device may send the indication information to the terminal device, so that the terminal device can determine, based on the indication information, the TBS configured by the network device.

203: The terminal device determines the indication information, where the indication information can be used for at least two of the following items: indicating that the transport block size TBS used by the terminal device to send data is the first TBS, indicating that the MS used by the terminal device to send data is the second TBS, and indicating the terminal device to select a TBS from the TBS set as the third TBS used by the terminal device to send data, the second TBS and/or the third TBS are/is TBSs/a TBS in the TBS set, and the TBS set is a set determined based on the first TBS.

204: The terminal device determines, based on the indication information, the TBS used to send data.

In this embodiment of this application, after receiving the indication information from the network device, the terminal device determines, based on the at least two items indicated by the indication information, that the network device allocates the first TBS or the second TBS to the terminal device, or selects the third TBS from the TBS set.

205: The terminal device sends the data based on the determined TBS.

In this embodiment of this application, after the terminal device determines, through the indication information, a TBS allocated by the network device to the terminal device, the terminal device may send the data to the network device by using the determined TBS, and the TBS used by the data is directly indicated by the network device to the terminal device, or the TBS used by the data is determined by the terminal device from the TBS set based on an indication of the network device.

206: The network device receives, based on the TBS determined by the indication information, the data sent by the terminal device.

In this embodiment of this application, for different indication information, the terminal device needs to send the data based on the TBS indicated by the indication information, and the network device may also receive, based on the TBS determined by the indication information, the data sent by the terminal device. For example, the network device indicates the first TBS or the second TBS, and then, the network device receives the data by using the first TBS or the second TBS, or the network device indicates the terminal device to determine the used TBS from the TBS set, and then, the network device may perform blind detection on the TBS in the TBS set, to determine that the terminal device uses the third TBS.

It can be learned from the example description in the foregoing embodiment that, in this embodiment of this application, the network device may determine the indication information. The indication information can be used for at least two of the following items: indicating that the TBS used by the terminal device to send data is the first TBS, indicating that the TBS used by the terminal device to send data is the second TBS, and indicating the terminal device to select a TBS from the TBS set as the third TBS used by the terminal device to send data. The network device sends the indication information to the terminal device, so that the terminal device can determine, based on the indication information, the TBS used to send data, to indicate the TBS used to send data.

Figure 3:
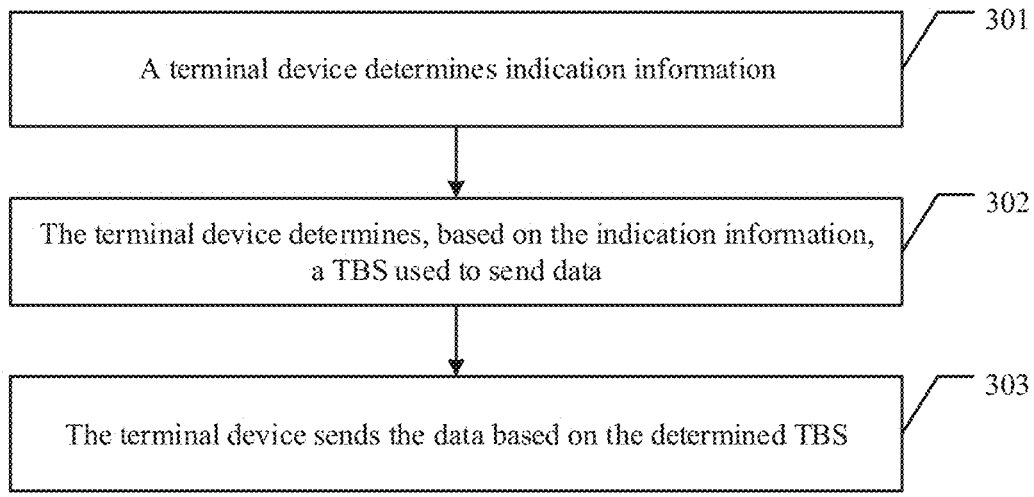
FIG. 3 is a schematic block diagram of a procedure of a data sending method according to an embodiment of this application.

The following separately describes, from perspectives of a terminal device and a network device, an information processing method provided in the embodiments of this application. First, referring to FIG. 3, an embodiment of this application provides an information transmission method, including the following steps.

301: A terminal device determines the indication information, where the indication information can be used for at least two of the following items: indicating that a transport block size TBS used by the terminal device to send data is a first TBS, indicating that the TBS used by the terminal device to send data is a second TBS, and indicating the terminal device to select a TBS from a. TBS set as a third TBS used by the terminal device to send data, where the second TBS and/or the third TBS are/is TBSs/a TBS in the TBS set, and the TBS set is a set determined based on the first TBS.

In some embodiments of this application, the terminal device determines the indication information based on cell-specific common signaling, where the cell-specific common signaling includes the indication information; and/or the terminal device determines the indication information based on a coverage enhancement level of the terminal device, where corresponding indication information is set for each coverage enhancement level supported by a network device; and/or the terminal device determines the indication information based on a coverage enhancement mode of the terminal device, where corresponding indication information is set for each coverage enhancement mode supported by the network device; and/or the terminal device determines the indication information based on a first subheader in a media access control (MAC) protocol data unit (PDU) sent by the network device, where the first subheader includes the indication information: and/or the terminal device determines the indication information by receiving a MAC random access response (RAR), where the MAC RAR includes the indication information.

The cell-specific common signaling may be a system message or a mobility control message, and the common signaling includes the indication information. In this case, after receiving the common signaling, the terminal device may determine the indication information. The network device may further set corresponding indication information based on each supported coverage enhancement (CE) level, so that each coverage enhancement level corresponds to corresponding indication information. The terminal device determines the indication information based on a coverage enhancement level of the terminal device. The network device may further set corresponding indication information based on each supported coverage enhancement mode, so that each coverage enhancement mode corresponds to corresponding indication information. The terminal device determines the indication information based on a coverage enhancement mode of the terminal device. For example, modes A and B are coverage enhancement level classifications of a connected mode, and CE levels 0, 1, 2, and 3 are coverage enhancement levels of an idle mode. The mode A corresponds to the CE levels 0 and 1, and the mode B corresponds to the CE levels 2 and 3. The network device may determine corresponding indication information based on a coverage enhancement mode or a coverage enhancement level. The network device may further use a first subheader in the MAC PDU to indicate the indication information. For example, the first subheader may be a subheader in a MAC header in the MAC PDU The network device may further indicate the indication information through the MAC RAR, and the terminal device may determine the indication information through the MAC RAR.

302: The terminal device determines, based on the indication information, the TBS used to send data.

In some embodiments of this application, the terminal device determines, based on a temporary cell radio network temporary identifier and the indication information, that the TBS used to send data is the first TBS, the second TBS, or the third TBS; or the terminal device determines, based on a random access radio network temporary identifier (RA-RNTI) and the indication information, that the TBS used to send data is the first TBS, the second TBS, or the third TBS; or the terminal device determines, based on a preamble identifier and the indication information at the TBS used to send data is the first TBS, the second TBS, or the third TBS.

The network device includes an enabling proportion coefficient N in the indication information, so that the terminal device that meets a condition can select a TBS in the TBS set or select the second TBS, and if the terminal device does not meet the condition, can select the first TBS. For example, a condition for enabling the terminal device is as follows: A value of N at a corresponding CE level is received; and (RA-RNTI) mod N=0. Similarly, the terminal device may also determine, based on the temporary cell radio network temporary identifier and the indication information, or the preamble identifier and the indication information, that the TBS used to send data is the first IBS, the second IBS, or the third TBS.

It should be noted that the foregoing embodiment is mainly for determining the third TBS. For example, if the temporary cell radio network temporary identifier does not meet the condition, the terminal device cannot autonomously select the third TBS from the TBS set. In this case, the terminal device selects the first TBS or the second TBS.

In some embodiments of this application, the data sending method provided in this embodiment of this application further includes: receiving, by the terminal device, first common signaling sent by the network device, and when the first common signaling does not include the indication information, determining, by the terminal device, that the TBS used to send data is the first IBS; or the data sending method provided in this embodiment of this application further includes: receiving, by the terminal device, second common signaling sent by the network device, and when the second common signaling includes the indication information, the determining, by the terminal device based on the indication information, the TBS used to send data includes: determining, by the terminal device, the third TBS based on the indication information and the IBS set; or the data sending method provided in this embodiment of this application further includes: receiving first dedicated signaling sent by the network device, and when the first dedicated signaling does not include the indication information, determining, by the terminal device, that the TBS used to send data is the first TBS; or the data sending method provided in this embodiment of this application further includes: receiving second dedicated signaling sent by the network device, and when the second dedicated signaling includes the indication information, the determining, by the terminal device based on the indication information, a TBS used to send data includes: determining, by the terminal device, the third TBS based on the indication information and the TBS set; or the data sending method provided in this embodiment of this application further includes: receiving a first MAC PDU sent by the network device, and when the first MAC PDU does not include the first subheader, determining, by the terminal device, that the TBS used to send data is the first TBS; or the data sending method provided in this embodiment of this application further includes: receiving a second MAC PDU sent by the network device, and when the second MAC PDU includes the first subheader, the determining, by the terminal device based on the indication information in the first subheader, a TBS used to send data includes: determining, by the terminal device, the third TBS based on the indication information and the TBS set.

The network device may determine, depending on whether the common signaling includes the indication information, that the first TBS is indicated to the terminal device, or indicate the terminal device to determine the third TBS based on the indication information and the TBS set. The network device may determine, based on different dedicated signaling, that the first TBS is indicated to the terminal device, or indicate the terminal device to determine the third TBS based on the indication information and the TBS set. The network device may determine, depending on whether the MAC PDU includes the indication information, that the first TBS is indicated to the terminal device, or indicate the terminal device to determine the third TBS based on the indication information and the TBS set. For example, the first MAC PDU does not include the indication information, and the second MAC PDU includes the indication information.

In some embodiments of this application, the terminal device determines the indication information based on the first subheader in the MAC PDU sent by the network device, where the first subheader includes the indication information, and the MAC PDU includes the MAC RAR;

the first subheader includes one or more pieces of indication information, and each piece of indication information corresponds to one or more terminal devices; and/or the first subheader is a last subheader in a MAC header of the MAC PDU.

The terminal device is at a coverage enhancement level 0, a coverage enhancement level 1, or a coverage enhancement mode A; and when the terminal device determines the indication information by receiving the MAC RAR, the MAC RAR includes a RAR grant, and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the RAR grant that indicate a narrowband index of a message 3; and/or a quantity of bits of the modulation and coding scheme field in the RAR grant is less than 3; and/or a quantity of bits of the repetition quantity field in the RAR grant is less than 2; and/or a quantity of bits of a transmit power control field in the RAR grant is less than 3; and/or a quantity of bits of a control channel narrowband index field in the message 3 or a message 4 in the RAR grant is less than 2.

Specifically, when the terminal device is at the coverage enhancement level 0, the coverage enhancement level 1 or the coverage enhancement mode A, the first subheader is the last subheader in the MAC header of the MAC PDU and then, the terminal device may determine the indication information through the first subheader. For example, the first subheader includes one or more pieces of indication information, and each piece of indication information corresponds to one or more terminal devices. Through correspondence between the indication information and the terminal devices, each terminal may determine, through corresponding indication information included in the first subheader, the TBS used to send data. The MAC RAR includes a RAR grant, and the MAC RAR does not include a reserved bit. Therefore, the MAC RAR may be used to transmit the indication information without changing a length of the MAC RAR. The RAR grant does not include one or more of a channel state information request field, an uplink delay field, a modulation and coding scheme field, or a repetition quantity field. Therefore, the RAR grant is used to transmit the indication information. Alternatively, the modulation and coding scheme field, the repetition quantity field, the transmit power control field, the control channel narrowband index field in the message 3 or the message 4 in the RAR grant may be further shortened. Therefore, when the length of the MAC RAR is not changed, a released field or bit is used to transmit the indication information.

In some embodiments of this application, the terminal device determines the indication information by receiving the MAC RAR;

the terminal device is at a coverage enhancement level 2, a coverage enhancement level 3, or a coverage enhancement mode B; and when the terminal device determines the indication information by receiving the MAC random access response RAR, the MAC RAR includes a RAR grant; and the MAC RAR does not include a reserved bit; and/or the RAR grant does not include one or more of a transport block size field, an uplink delay field, or a repetition quantity field; and/or a quantity of bits of the transport block size field in the MAC RAR grant is less than 2; and/or a quantity of bits of the repetition quantity field in the MAC RAR grant is less than 3; and/or a quantity of bits of a control channel narrowband index field in the message 3 or a message 4 in the MAC RAR grant is less than Specifically, when the terminal device is at the coverage enhancement level 2, the coverage enhancement level 3, or the coverage enhancement mode B, the terminal device may determine the indication information by receiving the MAC RAR. The MAC RAR includes the RAR grant, and the MAC RAR does not include the reserved bit. Therefore, when the length of the MAC RAR is not changed, the MAC RAR may be used to transmit the indication information. The RAR grant does not include one or more of a channel state information request field, an uplink delay field, a modulation and coding scheme field, or a repetition quantity field. Therefore, the RAR grant is used to transmit the indication information. Alternatively, the modulation and coding scheme field, the repetition quantity field, the transmit power control field, the control channel narrowband index field in the message 3, or the message 4 in the RAR grant may be further shortened. Therefore, when the length of the MAC RAR is not changed, a released field or bit is used to transmit the indication information.

303: The terminal device sends the data based on the determined TBS.

In this embodiment of this application, after the terminal device determines, through the indication information, a TBS allocated by the network device to the terminal device, the terminal device may send the data to the network device by using the determined TBS, and the TBS used by the data is directly indicated by the network device to the terminal device, or the MS used by the data is determined by the terminal device from the TBS set based on an indication of the network device.

It can be learned from the example description for this application in the foregoing embodiment that, in this embodiment of this application, the network device may determine the indication information. The indication information can be used for at least two of the following items: indicating that the TBS used by the terminal device to send data is the first TBS, indicating that the TBS used by the terminal device to send data is the second TBS, and indicating the terminal device to select a TBS from the TBS set as the third TBS used by the terminal device to send data. The network device sends the indication information to the terminal device, so that the terminal device can determine, based on the indication information, the TBS used to send data, to indicate the TBS used to send data.

Figure 4:
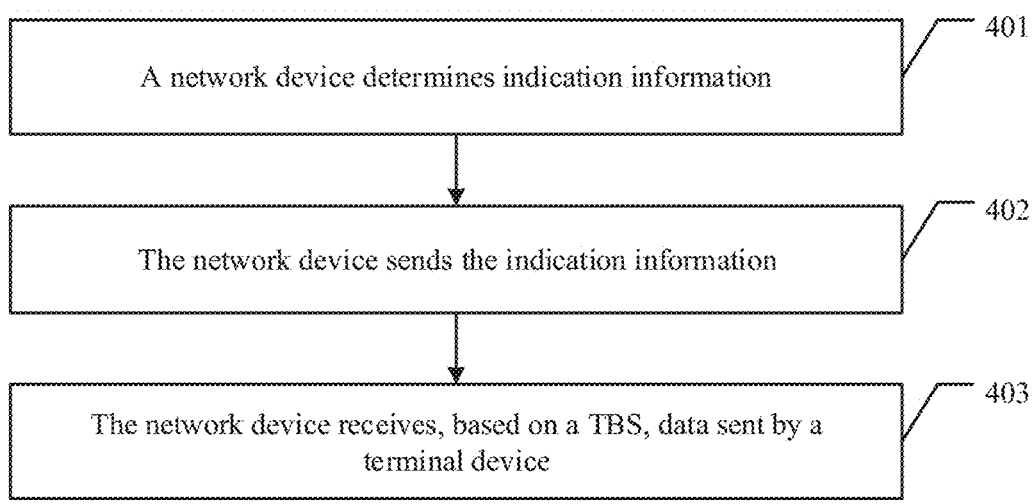
FIG. 4 is a schematic block diagram of a procedure of a data receiving method according to an embodiment of this application.

The foregoing embodiment describes, from a perspective of the terminal device, the data sending method provided in the embodiments of this application. The following describes, from a perspective of a network device, a data receiving method provided in the embodiments of this application, Referring to FIG. 4, an embodiment of this application provides a data receiving method, including the following steps.

401: A network device determines indication information, where the indication information can be used for at least two of the following items: indicating that a TBS used by a terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a TBS in the TBS set, the TBS set is a set determined based on the first TBS, and the indication information is used for one of the at least two items.

In some embodiments of this application, the network device sends the indication information through cell-specific common signaling, where the cell-specific common signaling includes the indication information; and/or the network device sends the indication information based on a coverage enhancement level, where the network device sends corresponding indication information for each coverage enhancement level supported by the network device; and/or the network device sends the indication information based on a coverage enhancement mode, where the network device sends corresponding indication information for each coverage enhancement mode supported by the network device; and/or the network device sends the indication information through a first subheader in a media access control MAC protocol data unit PDU, where the first subheader includes the indication information; and/or the network device sends the indication information through a MAC random access response RAR, where the MAC RAR includes the indication information.

402: The network device sends the indication information.

After the network device determines the indication information in the foregoing manner, the network device sends the indication information to the terminal device.

403: The network device receives, based on the TBS, the data sent by the terminal device.

If the network device determines that the MS used by the terminal device to send the data is the first TBS or the second TBS, in step 401, the network device may directly indicate the first TBS or the second TBS to the terminal device through the indication information. Correspondingly, in step 403, the network device may receive the data based on the first TBS or the second TBS. If the network device indicates the terminal device to select a TBS from the TBS set to send the data, in step 401, the network device indicates the terminal device to determine, through the indication information and the TBS set, the third TBS used to send data. Correspondingly, in step 403, the network device needs to determine the third TBS from the TBS set, and specifically, may determine the third TBS through blind detection.

In some embodiments of this application, the network device determines, based on a temporary cell radio network temporary identifier of the terminal device and the indication information, that the TBS used by the terminal device to send data is the first TBS, the second TBS, or the third TBS; or the network device determines, based on the indication information and a random access radio network temporary identifier corresponding to the terminal device, that the TBS used by the terminal device to send data is the first TBS, the second TBS, or the third TBS; or the network device determines, based on the indication information and a preamble identifier that corresponds to the terminal device, that the TBS used by the terminal device to send data is the first TBS, the second TBS, or the third TBS.

In some embodiments of this application, the data receiving method provided in this embodiment of this application further includes: sending, by the network device, first common signaling, and when the first common signaling does not include the indication information, the determining, by the network device, a TBS includes: determining, by the network device, that the TBS used by the terminal device to send data is the first TBS; or the data receiving method provided in this embodiment of this application further includes: sending, by the network device, second common signaling, where when the second common signaling includes the indication information, the determining, by the network device, a TBS includes: determining, by the network device, the third TBS based on the indication information and the TBS set; or the data receiving method provided in this embodiment of this application further includes: sending, by the network device, first dedicated signaling, and when the first dedicated signaling does not include the indication information, the determining, by the network device, a TBS includes: determining, by the network device, that the TBS used by the terminal device to send data is the first TBS; or the data receiving method provided in this embodiment of this application further includes: sending, by the network device, second dedicated signaling, where when the second dedicated signaling includes the indication information, the determining, by the network device, a TBS includes: determining, by the network device, the third TBS based on the indication information and the TBS set; or the data receiving method provided in this embodiment of this application further includes: sending, by the network device, a first MAC PDU, and when the first MAC PDU does not include the first subheader, the determining, by the network device, a TBS includes: determining, by the network device, that the IBS used by the terminal device to send data is the first TBS; or the data receiving method provided in this embodiment of this application further includes: sending, by the network device, a second MAC PDU, where when the second MAC PDU includes the first subheader, the determining, by the network device, a TBS includes: determining, by the network device, the third TBS based on the indication information in the first subheader and the TBS set.

In some embodiments of this application, the network device sends the indication information through the first subheader in the media access control MAC protocol data unit PDU, where the first subheader includes the indication information;

the MAC PDU includes the MAC RAR; and the first subheader includes one or more pieces of indication information, and each piece of indication information corresponds to one or more terminal devices, where N is a positive integer; and/or the first subheader is a last subheader in a MAC header.

In some embodiments of this application, the terminal device is at a coverage enhancement level 0, a coverage enhancement level 1, or a coverage enhancement mode A;

when the network device sends the indication information through the MAC random access response RAR, the MAC RAR includes a RAR grant; and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the random access response grant that indicate a narrowband index of a second message 3; and/or a quantity of bits of the modulation and coding scheme field in the RAR grant is less than 3; and/or a quantity of bits of the repetition quantity field in the RAR grant is less than 2; and/or a quantity of bits of a transmit power control field in the RAR grant is less than 3; and/or a quantity of bits of a control channel narrowband index field in the message 3 or a message 4 in the RAR grant is less than 2.

In some embodiments of this application, the terminal device determines the indication information by receiving the MAC random access response RAR;

the terminal device is at a coverage enhancement level 2, a coverage enhancement level 3, or a coverage enhancement mode B;

when the network device sends the indication information through the MAC random access response RAR, the MAC RAR includes a RAR grant; and the RAR does not include a reserved bit; and/or the RAR does not include one or more of a transport block size field, an uplink delay field, or a repetition quantity field; and/or a quantity of bits of the transport block size field in the RAR grant is less than 2; and/or a quantity of bits of the repetition quantity field in the RAR grant is less than 3; and/or a quantity of bits of a control channel narrowband index field in the message 3 or a message 4 in the RAR grant is less than 2.

It can be learned from the example description for this application in the foregoing embodiment that, in this embodiment of this application, the network device may determine the indication information. The indication information can be used for at least two of the following items: indicating that the TBS used by the terminal device to send data is the first TBS, indicating that the TBS used by the terminal device to send data is the second TBS, and indicating the terminal device to select a TBS from the TBS set as the third TBS used by the terminal device to send data. The network device sends the indication information to the terminal device, so that the terminal device can determine, based on the indication information, the TBS used to send data, to indicate the TBS used to send data.

The data sending method and the data receiving method provided in the embodiments of this application are described below by way of example by using examples of detailed scenarios.

In some embodiments of this application, the network device enables, through common signaling or dedicated signaling, UE at one or more coverage enhancement levels in CE levels 0, 1, 2, and 3, so that the UE can select a TBS value less than a largest TBS value notified through a system message.

For example, the UE is enabled by depending on whether the common signaling or the dedicated signaling includes the indication information. In other words, when the common signaling or the dedicated signaling includes the indication information, the UE is enabled to select a TBS less than a largest TBS configured by a network. If the signaling does not include the indication information, the UE cannot select a TBS less than a largest TBS configured by the network, and the UE sends data based on a largest TBS notified by the network.

For another example, the network device indicates, based on the CE level through the common signaling or the dedicated signaling, an enabling proportion coefficient N of one or more coverage levels in the CE levels 0, 1, 2, and 3, so that UE that meets a condition can select a TBS value less than the largest TBS value notified through the system message.

A condition for enabling the UE is:

A value of N at a corresponding CE level is received; and (RA-RNTI) mod N=0.

In a possible solution, the UE determines, depending on whether the signaling includes the indication information, a TBS to be used. In another possible solution, the indication information includes at least two states. One state indicates the UE to directly send data based on the largest TBS, and the other state indicates the UE to select a TBS whose value is less than the largest TBS value.

One or more coverage enhancement levels in the CE levels 0, 1, 2, and 3 are enabled through the common signaling or the dedicated signaling, to match a network load status.

In some other embodiments of this application, cell-specific enabling is performed on the UE through the common signaling or the dedicated signaling, so that the UE can select a TBS less than the largest TBS configured by the network.

For example, all UEs served by a current cell are enabled by depending on whether the common signaling or the dedicated signaling includes the indication information or a state indicated by the indication information. In other words, when the common signaling or the dedicated signaling exists, all the UEs served by the current cell are enabled to select a TBS less than a largest TBS configured by a network. If the signaling does not exist, all the UEs served by the current cell cannot select a TBS less than a largest TBS configured by the network, and the UEs send Msg3 based on a largest TBS notified by the network.

All the UEs served by the cell are enabled through the common signaling or dedicated signaling to select a TBS less than the largest TBS configured by the network. An advantage of small signaling overheads is provided.

In some other embodiments of this application, control information sent by the network enables a group of UEs to select a TBS less than the largest TBS configured by the network.

For example, a parameter N is notified through the common signaling or the dedicated signaling. N is a value in a value set, and a condition for enabling the UE is:

UE 2 receives the common signaling or dedicated signaling, that is, the value of N; and a RA-RNTI of UE 1 satisfies: (RA-RNTI) mod (N)=0.

Otherwise, the UE is not enabled. For example, a value set of N is {2, 3, 5, 7} or {2, 5, 7, 9}.

For another example, enabling is performed in a MAC header, and a subheader is newly added to the MAC header, to indicate that UE included in a current MAC PDU may select a TBS less than the largest TBS configured by the network.

The subheader in the MAC header includes a preamble ID. The UE obtains, based on a timing relationship, a moment at which the MAC RAR is received, and then selects, from the MAC RAR received at the corresponding moment, a MAC RAR whose preamble ID is the same as that of the subheader.

T=0 in the newly added subheader, and the newly added subheader is the last subheader. The value of N is indicated in the newly added subheader, and the value of N is a value in the value set. For example, the value of N indicated by the newly added subheader is shown in the following Table 1.

| Bit value | N |
|---|---|
| 00 | 1 |
| 01 | 2 |
| 10 | 4 |
| 11 | 8 |

A condition for enabling the UE is:

The subheader appears; and

The preamble ID satisfies: (PreambleID) mod (N)=0.

The network can configure the value of N based on the load status so that a group of UEs are enabled to select a TBS less than the largest TBS configured by the network.

In some other embodiments of this application, UE is enabled through the MAC RAR.

For MTC UE, the MAC RAR includes the reserved bit, and the bit may be used to enable the UE. An MCS/TBS may be released, and a bit occupied by this field can be used for enabling. A CSI field of a mode A may be released, and a bit occupied by the field may be used for enabling. For narrowband internet of things (NB-IoT) UE, the MAC-RAR includes the reserved bit, and the bit can be used to enable the UE.

The network may enable, based on a load status, one or some UEs to select a TBS less than the largest TBS configured by the network. If load is relatively heavy, fewer UEs are enabled to select a value less than the configured TBS value. Otherwise, more UEs are enabled. An enabling proportion determines a blind detection status of the base station. A higher enabling proportion indicates higher complexity of blind detection performed by the base station. The enabling proportion is configurable, so that network blind detection complexity matches with the network load.

It should be noted that, to make the description brief, the method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that the related actions and modules are not necessarily mandatory to the present application.

To better implement the foregoing solutions of the embodiments of the present application, the following further provides related apparatuses for implementing the foregoing solutions.

Figure 5:
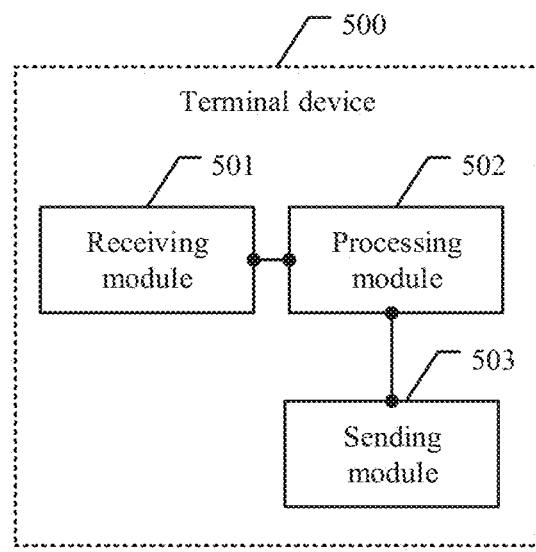
FIG. 5 is a schematic structural composition diagram of a terminal device according to an embodiment of this application.

In an embodiment of this application, as illustrated in FIG. 5, a terminal device 500 is provided. The terminal device 500 includes:

a processing module 502, configured to determine indication information, where the indication information can be used for at least two of the following items: indicating that a transport block size TBS used by the terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a TBS in the TBS set, the TBS set is a set determined based on the first TBS, and the indication information is used for one of the at least two items, where the processing module is further configured to determine, based on the indication information, the TBS used to send data; and a sending module 503, configured to send the data based on the determined TBS.

In some embodiments of this application, the processing module determines the indication information; and the processing module is specifically configured to determine the indication information based on cell-specific common signaling, where the cell-specific common signaling includes the indication information; and/or the processing module is specifically configured to determine the indication information based on a coverage enhancement level of the terminal device, where corresponding indication information is set for each coverage enhancement level supported by a network device; and/or the processing module is specifically configured to determine the indication information based on a coverage enhancement mode of the terminal device, where corresponding indication information is set for each coverage enhancement mode supported by the network device; and/or the processing module is specifically configured to determine the indication information based on a first subheader in a media access control MAC protocol data unit PDU sent by the network device, where the first subheader includes the indication information; and/or the processing module is specifically configured to determine the indication information by receiving a MAC random access response RAR, where the MAC RAR includes the indication information.

In some embodiments of this application, the processing module is specifically configured to determine, based on a temporary cell radio network temporary identifier and the indication information, that the TBS used to send data is the first TBS, the second TBS, or the third TBS; or the processing module is specifically configured to determine, based on a random access radio network temporary identifier and the indication information, that the TBS used to send data is the first TBS, the second TBS, or the third TBS; or the processing module is specifically configured to determine, based on a preamble identifier and the indication information, that the TBS used to send data is the first TBS, the second TBS, or the third TBS.

In some embodiments of this application, the terminal device further includes a receiving module 501, where the receiving module is configured to receive first common signaling sent by the network device, and when the first common signaling does not include the indication information, the processing module is further configured to determine that the TBS used to send data is the first TBS; or the receiving module is configured to receive second common signaling sent by the network device, and when the second common signaling includes the indication information, the processing module is specifically configured to determine the third TBS based on the indication information and the TBS set; or the receiving module is configured to receive first dedicated signaling sent by the network device, and when the first dedicated signaling does not include the indication information, the processing module is further configured to determine that the TBS used to send data is the first TBS; or the receiving module is configured to receive second dedicated signaling sent by the network device, and when the second dedicated signaling includes the indication information, the processing module is specifically configured to determine the third TBS based on the indication information and the TBS set; or the receiving module is configured to receive a first MAC PDU sent by the network device, and when the first MAC PDU does not include the first subheader, the processing module is further configured to determine that the TBS used to send data is the first TBS; or the receiving module is configured to receive a second MAC PDU sent by the network device, and when the second MAC PDU includes the first subheader, the processing module is specifically configured to determine the third TBS based on the indication information in the first subheader and the TBS set.

In some embodiments of this application, the processing module determines the indication information based on the first subheader in the media access control MAC protocol data unit PDU sent by the network device, where the first subheader includes the indication information;

the MAC PDU includes the MAC RAR; and the first subheader includes one or more pieces of indication information, and each piece of indication information corresponds to one or more terminal devices, where N is a positive integer; and/or the first subheader is a last subheader in a MAC header of the MAC PDU.

In some embodiments of this application, the terminal device is at a coverage enhancement level 0, a coverage enhancement level 1, or a coverage enhancement mode A; and when the terminal device determines the indication information by receiving the MAC RAR, the MAC RAR includes a RAR grant, and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the RAR grant that indicate a narrowband index of a message 3; and/or a quantity of bits of the modulation and coding scheme field in the RAR grant is less than 3; and/or a quantity of bits of the repetition quantity field in the RAR grant is less than 2; and/or a quantity of bits of a transmit power control field in the RAR grant is less than 3; and/or a quantity of bits of a control channel narrowband index field in the message 3 or a message 4 in the RAR grant is less than 2.

In some embodiments of this application, the processing module determines the indication information by receiving the MAC RAR;

the terminal device is at a coverage enhancement level 2, a coverage enhancement level 3, or a coverage enhancement mode B;

when the terminal device determines the indication information by receiving the MAC random access response RAR, the MAC RAR includes a RAR grant; and the MAC RAR does not include a reserved bit; and/or the RAR grant does not include one or more of a transport block size field, an uplink delay field, or a repetition quantity field; and/or a quantity of bits of the transport block size field in the MAC RAR grant is less than 2; and/or a quantity of bits of the repetition quantity field in the MAC RAR grant is less than 3; and/or a quantity of bits of a control channel narrowband index field in the message 3 or a message 4 in the MAC RAR grant is less than 2.

Figure 6:
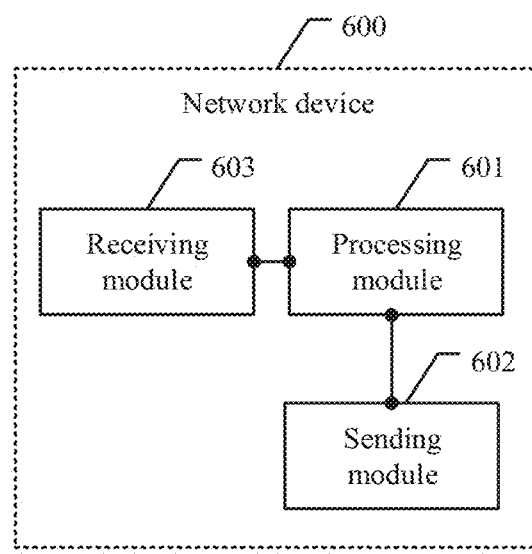
FIG. 6 is a schematic structural composition diagram of a network device according to an embodiment of this application.

Another embodiment of this application provides a network device 600, as illustrated in FIG. 6, including:

a processing module 601, configured to determine indication information, where the indication information can be used for at least two of the following items: indicating that a TBS used by a terminal device to send data is a first TBS, indicating that the TBS used by the terminal device to send data is a second TBS, and indicating the terminal device to select a TBS from a TBS set as a third TBS used by the terminal device to send data, the second TBS and/or the third TBS are/is TBSs/a IBS in the TBS set, the TBS set is a set determined based on the first TBS, and the indication information is used for one of the at least two items; and a sending module 602, configured to send the indication information, where the processing module is configured to determine the TBS; and a receiving module 603, configured to receive, based on the determined TBS, the data sent by the terminal device.

In some embodiments of this application, the sending module sends the indication information; and the sending module is configured to send the indication information through cell-specific common signaling, where the cell-specific common signaling includes the indication information; and/or the sending module is configured to send the indication information based on a coverage enhancement level, where the network device sends corresponding indication information for each coverage enhancement level supported by the network device; and/or the sending module is configured to send the indication information based on a coverage enhancement mode, where the network device sends corresponding indication information for each coverage enhancement mode supported by the network device; and/or the sending module is configured to send the indication information through a first subheader in a media access control MAC protocol data unit PDU, where the first subheader includes the indication information; and/or the sending module is configured to send the indication information through a MAC random access response RAR, where the MAC RAR includes the indication information.

In some embodiments of this application, the processing module is configured to determine, based on a temporary cell radio network temporary identifier of the terminal device and the indication information, that the TBS used by the terminal device to send data is the first TBS, the second TBS, or the third TBS; or the processing module is configured to determine, based on the indication information and a random access radio network temporary identifier that corresponds to the terminal device, that the TBS used by the terminal device to send data is the first TBS, the second TBS, or the third TBS; or the processing module is configured to determine, based on the indication information and a preamble identifier that corresponds to the terminal device, that the TBS used by the terminal device to send data is the first TBS, the second TBS, or the third TBS.

In some embodiments of this application, the sending module is configured to send first common signaling, and when the first common signaling does not include the indication information, the processing module is configured to determine that the TBS used by the terminal device to send data is the first TBS; or the sending module is configured to send second common signaling, and when the second common signaling includes the indication information, the processing module is configured to determine the third TBS based on the indication information and the TBS set; or the sending module is configured to send first dedicated signaling, and when the first dedicated signaling does not include the indication information, the processing module is configured to determine that the TBS used by the terminal device to send data is the first TBS; or the sending module is configured to send second dedicated signaling, and when the second dedicated signaling includes the indication information, the processing module is configured to determine the third TBS based on the indication information and the TBS set; or the sending module is configured to send a first MAC PDU, and when the first MAC PDU does not include the first subheader, the processing module is configured to determine that the TBS used by the terminal device to send data is the first TBS; or the sending module is configured to send a second MAC PDU, and when the second MAC PDU includes the first subheader, the processing module is configured to determine the third TBS based on the indication information and the TBS set.

In some embodiments of this application, the network device sends the indication information through the first subheader in the media access control MAC protocol data unit PDU, where the first subheader includes the indication information;

the MAC PDU includes the MAC RAR; and the first subheader includes one or more pieces of indication information, and each piece of indication information corresponds to one or more terminal devices, where N is a positive integer; and/or the first subheader is a last subheader in a MAC header.

In some embodiments of this application, the terminal device is at a coverage enhancement level 0, a coverage enhancement level 1, or a coverage enhancement mode A;

when the network device sends the indication information through the MAC random access response RAR, the MAC RAR includes a RAR grant; and the MAC RAR does not include a reserved bit; and/or the RAR grant does not include one or more of a channel state information request field, an uplink delay field, a modulation and coding scheme field, or a repetition quantity field; and/or a quantity of zero padding bits in the RAR grant is less than (4−M), where M is equal to a quantity of bits in the random access response grant that indicate a narrowband index of a second message 3; and/or a quantity of bits of the modulation and coding scheme field in the RAR grant is less than 3; and/or a quantity of bits of the repetition quantity field in the RAR grant is less than/or a quantity of bits of a transmit power control field in the RAR grant is less than 3; and/or a quantity of bits of a control channel narrowband index field in the message 3 or a message 4 in the RAR grant is less than 2.

In some embodiments of this application, the terminal device determines the indication information by receiving the MAC random access response RAR;

the terminal device is at a coverage enhancement level 2, a coverage enhancement level 3, or a coverage enhancement mode B;

when the network device sends the indication information through the MAC random access response RAR, the MAC RAR includes a RAR grant; and the RAR does not include a reserved bit; and/or the RAR does not include one or more of a transport block size field, an uplink delay field, or a repetition quantity field; and/or a quantity of bits of the transport block size field in the RAR grant is less than 2; and/or a quantity of bits of the repetition quantity field in the RAR grant is less than 3; and/or a quantity of bits of a control channel narrowband index field in the message 3 or a message 4 in the RAR grant is less than 2.

It should be noted that content such as information exchange between the modules/units of the apparatus and the execution processes thereof is based on the same idea as the method embodiments of the present application, and produces the same technical effects as the method embodiments of the present application. For the specific content, reference may be made to the foregoing description in the method embodiments of the present application, and details are not described herein again.

An embodiment of the present application further provides a computer storage medium. The computer storage medium stores a program, and the program performs some or all of steps recorded in the foregoing method embodiments.

Figure 7:
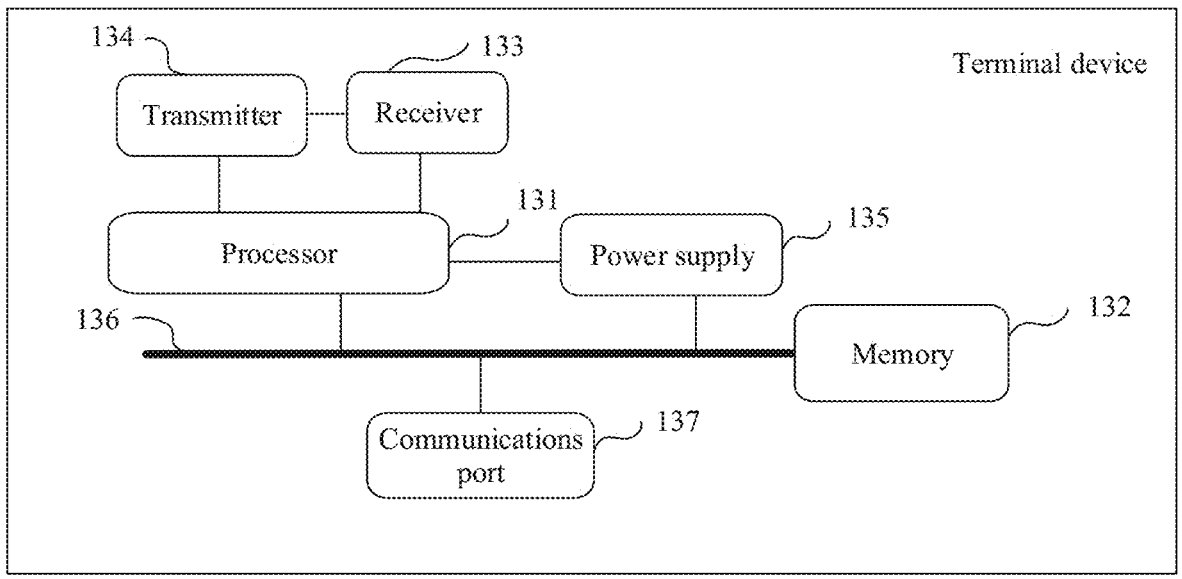
FIG. 7 is a schematic structural composition diagram of another terminal device according to an embodiment of this application.

FIG. 7 is a schematic structural diagram of still another device according to an embodiment of this application. The device is a terminal device, and the terminal device may include a processor 131 (for example, a CPU), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed. RAM memory, or may further include a non-volatile memory NVM, for example, at least one magnetic disk storage. The memory 132 may store various instructions, to implement various processing functions and implement method steps of this embodiment of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be receive and transmit antennas that are separately independent of each other on the terminal device. The communications bus 136 is configured to implement a communication connection between elements. The communications port 137 is configured to implement connection and communication between the terminal device and another peripheral.

In this embodiment of this application, the memory 132 is configured to store computer-executable program code, where the program code includes an instruction. When the processor 131 executes the instruction, the instruction enables the processor 131 to execute a processing action of the terminal device in the foregoing method embodiments, and enables the transmitter 134 to execute a sending action of the terminal device in the foregoing method embodiments. Implementation principles and technical effects thereof are similar, and details are not described herein again.

Figure 8:
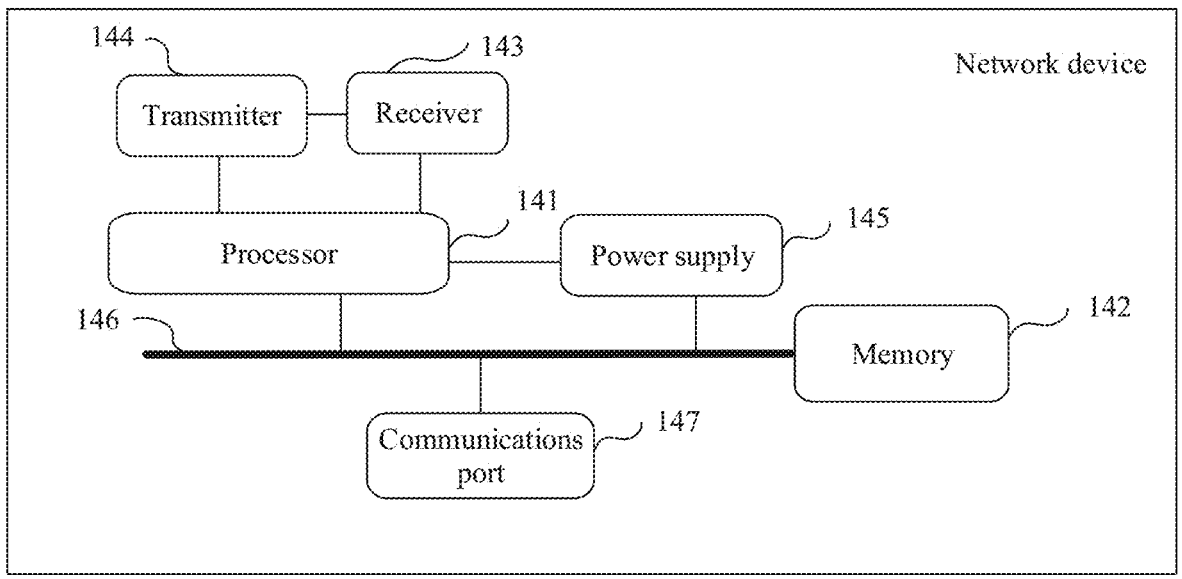
FIG. 8 is a schematic structural composition diagram of another network device according to an embodiment of this application.

FIG. 8 is a schematic structural diagram of another device according to an embodiment of this application. The device is a network device, and the network device may include a processor (for example, a CPU) 141, a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, or may further include a non-volatile memory NVM, for example, at least one magnetic disk storage. The memory 142 may store various instructions, to implement various processing functions and implement method steps of this embodiment of this application. Optionally, the network device in this embodiment of this application may further include one or more of a power supply 145, a communications bus 146, and a communications port 147. The receiver 143 and the transmitter 144 may be integrated into a transceiver of the network device, or may be receive and transmit antennas that are separately independent of each other on the network device. The communications bus 146 is configured to implement a communication connection between elements. The communications port 147 is configured to implement connection and communication between the network device and another peripheral.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in a terminal performs the wireless communication method in any one of the first aspect. Optionally, the storage unit is a storage unit in the chip, such as a register or a cache. Alternatively, the storage unit may be a storage unit that is in the terminal and that is located outside the chip, such as a read-only memory (ROM) or another type of static storage device that can store static information and an instruction, a random access memory (RAM), or the like.

The processor mentioned in any of the foregoing designs may be a general-purpose central processing unit (CPU), a microprocessor, an application-specific integrated circuit (ASIC), or one or more integrated circuits configured to control program execution of the wireless communication method according to the first aspect.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present application without creative efforts.

Based on the description of the foregoing implementations, a person skilled in the art may clearly understand that this application may be implemented by software in addition to necessary universal hardware, or by special-purpose hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit. However, as for this application, a software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. A data sending method, comprising:
  determining, by a terminal device, indication information, wherein the indication information comprises one of at least two of:
    first information indicating that a transport block size (TBS) used by the terminal device to send data is a first TBS,
    second information indicating that the TBS used by the terminal device to send data is a second TBS, or third information indicating the terminal device to select a TBS from a TBS set as a third TBS used by the terminal device to send data, wherein the TBS set is determined based on the first TBS and comprises at least one of the second TBS or the third TBS;

in response to determining the indication information indicating that the terminal device is enabled by a network device to select a TBS other than the first TBS from the TBS set based on a load status of the network device, determining, by the terminal device based on the indication information, the TBS used to send data to be the third TBS; and sending, by the terminal device, the data based on the determined TBS to the network device that is configured to perform blind detection to determine that the TBS used by the terminal device to send the data is the third TBS.

2. The method according to claim 1, wherein the determining, by a terminal device, indication information comprises at least one of:

determining, by the terminal device, the indication information based on cell-specific common signaling, wherein the cell-specific common signaling comprises the indication information;

determining, by the terminal device, the indication information based on a coverage enhancement level of the terminal device, wherein corresponding indication information is set for each coverage enhancement level supported by the network device;

determining, by the terminal device, the indication information based on a coverage enhancement mode of the terminal device, wherein corresponding indication information is set for each coverage enhancement mode supported by the network device;

determining, by the terminal device, the indication information based on a first subheader in a media access control (MAC) protocol data unit (PDU) sent by the network device, wherein the first subheader comprises the indication information; or determining, by the terminal device, the indication information by receiving an MAC random access response (RAR), wherein the MAC RAR comprises the indication information.

3. The method according to claim 1, comprising one of:

receiving, by the terminal device, first common signaling sent by the network device, and if the first common signaling does not comprise the indication information, determining, by the terminal device, that the TBS used to send data is the first TBS;

receiving, by the terminal device, second common signaling sent by the network device, and if the second common signaling comprises the indication information, determining, by the terminal device, that the TBS used to send data is the third TBS determined based on the indication information and the TBS set;

receiving first dedicated signaling sent by the network device, and if the first dedicated signaling does not comprise the indication information, determining, by the terminal device, that the TBS used to send data is the first TBS;

receiving second dedicated signaling sent by the network device, and if the second dedicated signaling comprises the indication information, determining, by the terminal device, that the TBS used to send data is the third TBS determined based on the indication information and the TBS set;

receiving a first MAC PDU sent by the network device, and if the first MAC PDU does not comprise a first subheader including the indication information, determining, by the terminal device, that the TBS used to send data is the first TBS; or receiving a second MAC PDU sent by the network device, and if the second MAC PDU comprises the first subheader, determining, by the terminal device, that the TBS used to send data is the third TBS determined based on the indication information in the first subheader and the TBS set.

4. The method according to claim 1, wherein the terminal device is at a coverage enhancement level 0, a coverage enhancement level 1, or a coverage enhancement mode A;

wherein the determining, by a terminal device, indication information comprises:

determining the indication information by receiving an MAC RAR that comprises a RAR grant, and wherein the MAC RAR comprises one or more characteristics comprising:

a characteristic that the MAC RAR does not comprise a reserved bit;

a characteristic that the RAR grant does not comprise one or more of a channel state information request field, an uplink delay field, a modulation and coding scheme field, or a repetition quantity field;

a quantity of zero padding bits in the RAR grant being less than (4−M), where M is equal to a quantity of bits in the RAR grant that indicate a narrowband index of a message 3;

a quantity of bits of a modulation and coding scheme field in the RAR grant being less than 3;

a quantity of bits of a repetition quantity field in the RAR grant being less than 2;

a quantity of bits of a transmit power control field in the RAR grant being less than 3; or a quantity of bits of a control channel narrowband index field in the message 3 or a message 4 in the RAR grant being less than 2.

5. The method according to claim 1, wherein the terminal device is at a coverage enhancement level 2, a coverage enhancement level 3, or a coverage enhancement mode B;

wherein the determining, by a terminal device, indication information comprises:

determining the indication information by receiving an MAC RAR that comprises a RAR grant, and wherein the MAC RAR comprises one or more characteristics comprising:

a characteristic that the MAC RAR does not comprise a reserved bit;

a characteristic that the RAR grant does not comprise one or more of a transport block size field, an uplink delay field, or a repetition quantity field;

a quantity of bits of a transport block size field in the RAR grant being less than 2;

a quantity of bits of a repetition quantity field in the RAR grant being less than 3; or a quantity of bits of a control channel narrowband index field in a message 3 or a message 4 in the RAR grant being less than 2.

6. An information sending method, comprising:

determining, by a network device, indication information, wherein indication information comprises one of at least two of:

first information indicating that a transport block size (TBS) used by a terminal device to send data is a first TBS, second information indicating that the TBS used by the terminal device to send data is a second TBS, or third information indicating the terminal device to select a TBS from a TBS set as a third TBS used by the terminal device to send data, wherein the TBS set is determined based on the first TBS and comprises at least one of the second TBS or the third TBS;

enabling one or more terminal devices to select a TBS other than the first TBS from the TBS set based on a load status of the network device;

sending, by the network device, the indication information to the terminal device;

in response to determining that the terminal device is among the one or more enabled terminal devices, determining, through blind detection, that the TBS used by the terminal device to send the data is the third TBS; and receiving, by the network device based on the third TBS, the data sent by the terminal device.

7. The method according to claim 6, wherein the sending, by the network device, the indication information comprises at least one of:

sending, by the network device, the indication information through cell-specific common signaling, wherein the cell-specific common signaling comprises the indication information;

sending, by the network device, the indication information based on a coverage enhancement level, wherein the network device sends corresponding indication information for each coverage enhancement level supported by the network device;

sending, by the network device, the indication information based on a coverage enhancement mode, wherein the network device sends corresponding indication information for each coverage enhancement mode supported by the network device;

sending, by the network device, the indication information through a first subheader in a media access control (MAC) protocol data unit (PDU), wherein the first subheader comprises the indication information; or sending, by the network device, the indication information through an MAC random access response (RAR), wherein the MAC RAR comprises the indication information.

8. The method according to claim 6, comprising one of:

sending, by the network device, first common signaling, and if the first common signaling does not comprise the indication information, determining, by the network device, that the TBS used by the terminal device to send data is the first TBS and receiving the data based on the first TBS;

sending, by the network device, second common signaling, and if the second common signaling comprises the indication information, determining, by the network device, the third TBS based on the indication information and the TBS set and receiving the data based on the third TBS;

sending, by the network device, first dedicated signaling, and if the first dedicated signaling does not comprise the indication information, determining, by the network device, that the TBS used by the terminal device to send data is the first TBS and receiving the data based on the first TBS;

sending, by the network device, second dedicated signaling, and if the second dedicated signaling comprises the indication information, determining, by the network device, the third TBS based on the indication information and the TBS set and receiving the data based on the third TBS;

sending, by the network device, a first MAC PDU, and if the first MAC PDU does not comprise a first subheader including the indication information, determining, by the network device, that the TBS used by the terminal device to send data is the first TBS and receiving the data based on the first TBS; or sending, by the network device, a second MAC PDU, and if the second MAC PDU comprises the first subheader, determining, by the network device, the third TBS based on the indication information in the first subheader and the TBS set and receiving the data based on the third TBS.

9. The method according to claim 6, wherein the terminal device is at a coverage enhancement level 0, a coverage enhancement level 1, or a coverage enhancement mode A;

wherein the sending, by the network device, the indication information comprises:

sending, by the network device, the indication information through an MAC that comprises a RAR grant; and wherein the MAC RAR comprises one or more characteristics comprising:

a characteristic that the MAC RAR does not comprise a reserved bit;

a characteristic that the RAR grant does not comprise one or more of a channel state information request field, an uplink delay field, a modulation and coding scheme field, or a repetition quantity field;

a quantity of zero padding bits in the RAR grant being less than (4−M), where M is equal to a quantity of bits in the RAR grant that indicate a narrowband index of a second message 3;

a quantity of bits of a modulation and coding scheme field in the RAR grant being less than 3;

a quantity of bits of a repetition quantity field in the RAR grant being less than 2;

a quantity of bits of a transmit power control field in the RAR grant being less than 3; or a quantity of bits of a control channel narrowband index field in the message 3 or a message 4 in the RAR grant being less than 2.

10. The method according to claim 6, wherein the terminal device is at a coverage enhancement level 2, a coverage enhancement level 3, or a coverage enhancement mode B;

wherein the sending, by the network device, the indication information comprises:

sending, by the network device, the indication information through an MAC that comprises a RAR grant; and wherein the MAC RAR comprises one or more characteristics comprising:

a characteristic that the MAC RAR does not comprise a reserved bit;

a characteristic that the RAR grant does not comprise one or more of a transport block size field, an uplink delay field, or a repetition quantity field;

a quantity of bits of a transport block size field in the RAR grant being less than 2;

a quantity of bits of a repetition quantity field in the RAR grant being less than 3; or a quantity of bits of a control channel narrowband index field in a message 3 or a message 4 in the RAR grant being less than 2.

11. A device, comprising:
at least one processor; and
a non-transitory computer-readable storage medium coupled to the at least one processor and storing programming instructions for execution by the at least one processor, wherein the programming instructions instruct the at least one processor to perform operations comprising:
  determining indication information, wherein the indication information comprises one of at least two of:
    first information indicating that a transport block size (TBS) used by the device to send data is a first TBS,
    second information indicating that the TBS used by the device to send data is a second TBS, or
    third information indicating the device to select a TBS from a TBS set as a third TBS used by the device to send data, wherein the TBS set is determined based on the first TBS and comprises at least one of the second TBS or the third TBS;
  determining, based on the indication information, the TBS used to send data; and
  sending the data based on the determined TBS to a network device,
  wherein the operations comprise:
    if the indication information indicates that the device is enabled by a network device to select a TBS other than the first TBS from the TBS set based on a load status of the network device, determining, based on the indication information, the TBS used to send data to be the third TBS, and
    sending the data based on the third TBS to the network device that is configured to perform blind detection to determine that the TBS used by the device to send the data is the third TBS.

12. The device according to claim 11, wherein the determining indication information comprises at least one of:
  determining the indication information based on cell-specific common signaling, wherein the cell-specific common signaling comprises the indication information;
  determining the indication information based on a coverage enhancement level of the device, wherein corresponding indication information is set for each coverage enhancement level supported by the network device;
  determining the indication information based on a coverage enhancement mode of the device, wherein corresponding indication information is set for each coverage enhancement mode supported by the network device;
  determining the indication information based on a first subheader in a media access control (MAC) protocol data unit (PDU) sent by the network device, wherein the first subheader comprises the indication information; or
  determining the indication information by receiving a MAC random access response (RAR), wherein the MAC RAR comprises the indication information.

13. The device according to claim 11, wherein the operations comprise one of:
  receiving first common signaling sent by the network device, and if the first common signaling does not comprise the indication information, determining that the TBS used to send data is the first TBS;
  receiving second common signaling sent by the network device, and if the second common signaling comprises the indication information, determining that the TBS used to send data is the third TBS determined based on the indication information and the TBS set;
  receiving first dedicated signaling sent by the network device, and if the first dedicated signaling does not comprise the indication information, determining that the TBS used to send data is the first TBS;
  receiving second dedicated signaling sent by the network device, and if the second dedicated signaling comprises the indication information, determining that the TBS used to send data is the third TBS determined based on the indication information and the TBS set;
  receiving a first MAC PDU sent by the network device, and if the first MAC PDU does not comprise a first subheader including the indication information, determining that the TBS used to send data is the first TBS; or
  receiving a second MAC PDU sent by the network device, and if the second MAC PDU comprises the first subheader, determining that the TBS used to send data is the third TBS determined based on the indication information and the TBS set.

14. The device according to claim 11, wherein the device is at a coverage enhancement level 0, a coverage enhancement level 1, or a coverage enhancement mode A;
  wherein the device determines the indication information by receiving an MAC RAR that comprises a RAR grant; and
  wherein the MAC RAR comprises one or more characteristics comprising:
    a characteristic that the MAC RAR does not comprise a reserved bit;
    a characteristic that the RAR grant does not comprise one or more of a channel state information request field, an uplink delay field, a modulation and coding scheme field, or a repetition quantity field;
    a quantity of zero padding bits in the RAR grant being less than (4−M), where M is equal to a quantity of bits in the RAR grant that indicate a narrowband index of a message 3;
    a quantity of bits of the modulation and coding scheme field in the RAR grant being less than 3;
    a quantity of bits of the repetition quantity field in the RAR grant being less than 2;
    a quantity of bits of a transmit power control field in the RAR grant being less than 3; or
    a quantity of bits of a control channel narrowband index field in the message 3 or a message 4 in the RAR grant being less than 2.

15. The device according to claim 11, wherein the device is at a coverage enhancement level 2, a coverage enhancement level 3, or a coverage enhancement mode B;
  wherein the device determines the indication information by receiving an MAC RAR that comprises a RAR grant; and
  wherein the MAC comprises one or more characteristics comprising:
    a characteristic that the MAC RAR does not comprise a reserved bit;
    a characteristic that the RAR grant does not comprise one or more of a transport block size field, an uplink delay field, or a repetition quantity field;
    a quantity of bits of the transport block size field in the RAR grant being less than 2;
    a quantity of bits of the repetition quantity field in the RAR grant being less than 3; or a quantity of bits of a control channel narrowband index field in a message 3 or a message 4 in the RAR grant being less than 2.

16. A device, comprising:
at least one processor; and
a non-transitory computer-readable storage medium coupled to the at least one processor and storing programming instructions for execution by the at least one processor, wherein the programming instructions instruct the at least one processor to perform operations comprising:
determining indication information, wherein the indication information comprises one of at least two of:
first information indicating that a transport block size (TBS) used by a terminal device to send data is a first TBS,
second information indicating that the TBS used by the terminal device to send data is a second TBS, or
third information indicating the terminal device to select a TBS from a TBS set as a third TBS used by the terminal device to send data, wherein the TBS set is determined based on the first TBS and comprises at least the second TBS or the third TBS;
sending the indication information to the terminal device; and
receiving, based on the TBS, the data sent by the terminal device,
wherein the operations comprise:
enabling one or more terminal devices to select a TBS other than the first TBS from the TBS set based on a load status;
if the terminal device is among the one or more enabled terminal devices, determining, through blind detection, that the TBS used by the terminal device to send the data is the third TBS; and
receiving the data sent by the terminal device based on the third TBS.

17. The device according to claim 16, wherein the sending the indication information comprises at least one of:
sending the indication information through cell-specific common signaling, wherein the cell-specific common signaling comprises the indication information;
sending the indication information based on a coverage enhancement level, wherein the device sends corresponding indication information for each coverage enhancement level supported by the device;
sending the indication information based on a coverage enhancement mode, wherein the device sends corresponding indication information for each coverage enhancement mode supported by the device;
sending the indication information through a first subheader in a media access control (MAC) protocol data unit (PDU), wherein the first subheader comprises the indication information; or
sending the indication information through an MAC random access response (RAR), wherein the MAC RAR comprises the indication information.

18. The device according to claim 16, wherein the operations comprise one of:
sending first common signaling, and if the first common signaling does not comprise the indication information, determining that the TBS used by the terminal device to send data is the first TBS and receiving the data based on the first TBS;
sending second common signaling, and if the second common signaling comprises the indication information, determining the third TBS based on the indication information and the TBS set and receiving the data based on the third TBS;
sending first dedicated signaling, and if the first dedicated signaling does not comprise the indication information, determining that the TBS used by the terminal device to send data is the first TBS and receiving the data based on the first TBS;
sending second dedicated signaling, and if the second dedicated signaling comprises the indication information, determining the third TBS based on the indication information and the TBS set and receiving the data based on the third TBS;
sending a first MAC PDU, and if the first MAC PDU does not comprise a first subheader including the indication information, determining that the TBS used by the terminal device to send data is the first TBS and receiving the data based on the first TBS; or
sending a second MAC PDU, and if the second MAC PDU comprises the first subheader, determining the third TBS based on the indication information in the first subheader and the TBS set and receiving the data based on the third TBS.

19. The device according to claim 16, wherein the terminal device is at a coverage enhancement level 0, a coverage enhancement level 1, or a coverage enhancement mode A;
wherein the device sends the indication information through an MAC RAR that comprises a RAR grant; and
wherein the MAC RAR comprises one or more characteristics comprising:
a characteristic that the MAC RAR does not comprise a reserved bit;
a characteristic that the RAR grant does not comprise one or more of a transport block size field, an uplink delay field, or a repetition quantity field;
a quantity of zero padding bits in the RAR grant being less than (4−M), where M is equal to a quantity of bits in the RAR grant that indicate a narrowband index of a second message 3;
a quantity of bits of a modulation and coding scheme field in the RAR grant being less than 3;
a quantity of bits of a repetition quantity field in the RAR grant being less than 2;
a quantity of bits of a transmit power control field in the RAR grant being less than 3; or
a quantity of bits of a control channel narrowband index field in the message 3 or a message 4 in the RAR grant being less than 2.

20. The device according to claim 16, wherein the terminal device is at a coverage enhancement level 2, a coverage enhancement level 3, or a coverage enhancement mode B;
wherein the device sends the indication information through an MAC RAR that comprises a RAR grant; and
wherein the MAC RAR comprises one or more characteristics comprising:
a characteristic that the MAC RAR does not comprise a reserved bit;
a characteristic that the RAR grant does not comprise one or more of a transport block size field, an uplink delay field, or a repetition quantity field;
a quantity of bits of a transport block size field in the RAR grant being less than 2;

a quantity of bits of a repetition quantity field in the RAR grant being less than 3; or a quantity of bits of a control channel narrowband index field in a message 3 or a message 4 in the RAR grant being less than 2.

* * * * *